United States Patent
Shinomiya

(10) Patent No.: US 10,216,477 B2
(45) Date of Patent: Feb. 26, 2019

(54) DATA PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Takeshi Shinomiya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 604 days.

(21) Appl. No.: 14/610,986

(22) Filed: Jan. 30, 2015

(65) Prior Publication Data
US 2015/0220305 A1    Aug. 6, 2015

(30) Foreign Application Priority Data
Feb. 3, 2014 (JP) ................. 2014-018672

(51) Int. Cl.
| | |
|---|---|
| *G06F 17/30* | (2006.01) |
| *G06F 7/24* | (2006.01) |
| *H04N 1/00* | (2006.01) |
| H04W 4/80 | (2018.01) |
| H04W 28/18 | (2009.01) |
| H04N 5/232 | (2006.01) |
| H04W 4/00 | (2018.01) |

(52) U.S. Cl.
CPC .......... *G06F 7/24* (2013.01); *G06F 17/30286* (2013.01); *H04N 1/00307* (2013.01); *G03B 2206/00* (2013.01); *H04N 5/23206* (2013.01); *H04N 2201/006* (2013.01); *H04N 2201/0084* (2013.01); *H04N 2201/3214* (2013.01); *H04N 2201/3215* (2013.01); *H04N 2201/3253* (2013.01); *H04N 2201/3278* (2013.01); *H04W 4/008* (2013.01); *H04W 4/80* (2018.02); *H04W 28/18* (2013.01)

(58) Field of Classification Search
CPC ................................. G06F 17/30286
USPC ........................................ 707/752
See application file for complete search history.

(56) References Cited

U.S. PATENT DOCUMENTS

| | | | | |
|---|---|---|---|---|
| 8,244,917 B2* | 8/2012 | Takayama | ............ | H04W 36/14 455/41.1 |
| 2008/0242223 A1* | 10/2008 | Yamada | ............ | H04N 1/00307 455/3.06 |
| 2011/0202460 A1* | 8/2011 | Buer | ................ | G06Q 20/1085 705/44 |

FOREIGN PATENT DOCUMENTS

JP           2003-8816 A       1/2003

* cited by examiner

*Primary Examiner* — Joshua Bullock
(74) *Attorney, Agent, or Firm* — Canon U.S.A., Inc. IP Division

(57) ABSTRACT

A data processing apparatus includes a recording control unit configured to perform control so that a plurality of contents is recorded in a recording medium, a first communication unit configured to connect to an external device via a first communication, and receive via the first communication a communication parameter for connecting via a second communication different from the first communication to the external device and information to be used to sort the plurality of contents, a second communication unit configured to connect to the external device via the second communication based on the communication parameter received via the first communication unit, and a control unit configured to perform control so that the plurality of contents is sorted based on the information to be used to sort the plurality of contents that is received from the external device via the first communication unit.

9 Claims, 29 Drawing Sheets

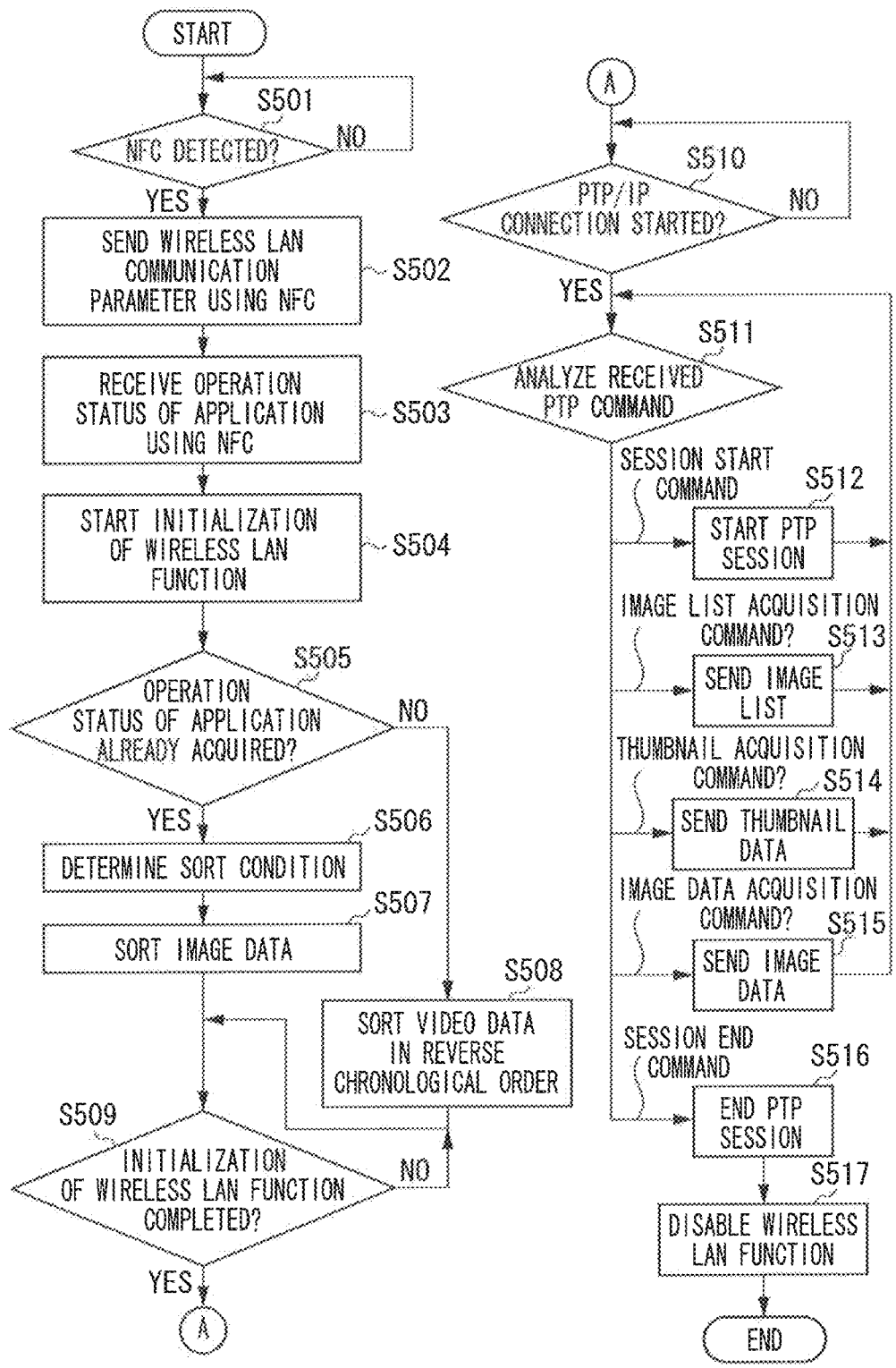

FIG. 6

| SSID | CAMERA12345 | 601 |
|---|---|---|
| AUTHENTICATION/ENCRYPTION METHOD | WPA2-PSK(TKIP) | 602 |
| PASSPHRASE | ABCDEFGHIJKLMN | 603 |
| IP ADDRESS ASSIGNED TO MOBILE PHONE | 192.168.1.2 | 604 |
| NET MASK | 255.255.255.0 | 605 |
| GATEWAY | 192.168.1.1 | 606 |
| IP ADDRESS ASSIGNED TO DIGITAL CAMERA | 192.168.1.1 | 607 |

FIG. 8

| APPLICATION TYPE | DIARY/BLOG | ~801 |
| --- | --- | --- |
| DATE/TIME | 2012/06/15/ 18:33 | ~802 |
| DATA TYPE | STILL IMAGE DATA | ~803 |

FIG. 9

| FILE NAME | TYPE | IMAGING DATE AND TIME | SIZE |
|---|---|---|---|
| IMG_0001.JPG | STILL IMAGE | 2012/06/13 12:12 | 5,843,661 |
| IMG_0002.JPG | STILL IMAGE | 2012/06/15 10:55 | 4,869,223 |
| MVI_0003.MOV | MOVING IMAGE | 2012/06/15 11:42 | 54,556,740 |
| IMG_0004.JPG | STILL IMAGE | 2012/06/15 15:33 | 5,886,312 |
| MVI_0005.MOV | MOVING IMAGE | 2012/06/15 18:11 | 21,843,691 |
| IMG_0006.JPG | STILL IMAGE | 2012/06/15 19:22 | 6,444,334 |
| IMG_0007.JPG | STILL IMAGE | 2012/06/16 09:54 | 5,115,486 |
| IMG_0008.JPG | STILL IMAGE | 2012/06/16 12:31 | 5,612,541 |
| IMG_0009.JPG | STILL IMAGE | 2012/06/16 13:44 | 4,953,445 |
| MVI_0010.MOV | MOVING IMAGE | 2012/06/16 17:39 | 35,81,326 |

| FILE NAME | TYPE | IMAGING DATE AND TIME | SIZE | Object Handle |
|---|---|---|---|---|
| IMG_0004.JPG | STILL IMAGE | 2012/06/15 15:33 | 5,886,312 | 0x00000001 |
| IMG_0002.JPG | STILL IMAGE | 2012/06/15 10:55 | 4,869,223 | 0x00000002 |
| IMG_0001.JPG | STILL IMAGE | 2012/06/13 12:12 | 5,843,661 | 0x00000003 |
| IMG_0006.JPG | STILL IMAGE | 2012/06/15 19:22 | 6,444,334 | 0x00000004 |
| IMG_0007.JPG | STILL IMAGE | 2012/06/16 09:54 | 5,115,486 | 0x00000005 |
| IMG_0008.JPG | STILL IMAGE | 2012/06/16 12:31 | 5,612,541 | 0x00000006 |
| IMG_0009.JPG | STILL IMAGE | 2012/06/16 13:44 | 4,953,445 | 0x00000007 |

FIG. 10B

| FILE NAME | TYPE | IMAGING DATE AND TIME | SIZE | Object Handle |
|---|---|---|---|---|
| MVI_0010.MOV | MOVING IMAGE | 2012/06/16 17:39 | 35,81,326 | 0x00000001 |
| IMG_0009.JPG | STILL IMAGE | 2012/06/16 13:44 | 4,953,445 | 0x00000002 |
| IMG_0008.JPG | STILL IMAGE | 2012/06/16 12:31 | 5,612,541 | 0x00000003 |
| IMG_0007.JPG | STILL IMAGE | 2012/06/16 09:54 | 5,115,486 | 0x00000004 |
| IMG_0006.JPG | MOVING IMAGE | 2012/06/15 19:22 | 6,444,334 | 0x00000005 |
| MVI_0005.MOV | STILL IMAGE | 2012/06/15 18:11 | 21,843,691 | 0x00000006 |
| IMG_0004.JPG | MOVING IMAGE | 2012/06/15 15:33 | 5,886,312 | 0x00000007 |
| MVI_0003.MOV | STILL IMAGE | 2012/06/15 11:42 | 54,556,740 | 0x00000008 |
| IMG_0002.JPG | STILL IMAGE | 2012/06/15 10:55 | 4,869,223 | 0x00000009 |
| IMG_0001.JPG | STILL IMAGE | 2012/06/13 12:12 | 5,843,661 | 0x0000000A |

| | | |
|---|---|---|
| WIRELESS LAN COMMUNICATION PARAMETER | SSID | MOBILE98765 |
| | AUTHENTICATION/ENCRYPTION METHOD | WPA2-PSK(TKIP) |
| | PASSPHRASE | AGAEGEGFSCVDSF |
| | IP ADDRESS ASSIGNED TO MOBILE PHONE | 192.168.1.2 |
| | NET MASK | 255.255.255.0 |
| | GATEWAY | 192.168.1.1 |
| | IP ADDRESS ASSIGNED TO DIGITAL CAMERA | 192.168.1.1 |
| OPERATION STATE OF APPLICATION | APPLICATION TYPE | LOCATION |
| | LOCATION | N35.6400 E139.8622 |
| | DATA TYPE | STILL IMAGE DATA |

| | FILE NAME | TYPE | IMAGING DATE AND TIME | SIZE | IMAGING PLACE |
|---|---|---|---|---|---|
| 1501 | IMG_0001.JPG | STILL IMAGE | 2012/06/13 12:12 | 5,843,661 | N35.6226 E139.8367 |
| 1502 | IMG_0002.JPG | STILL IMAGE | 2012/06/15 10:55 | 4,869,223 | N35.6240 E139.7687 |
| 1503 | MVI_0003.MOV | MOVING IMAGE | 2012/06/15 11:42 | 54,556,740 | N/A |
| 1504 | IMG_0004.JPG | STILL IMAGE | 2012/06/15 15:33 | 5,886,312 | N35.5821 E139.7425 |
| 1505 | MVI_0005.MOV | MOVING IMAGE | 2012/06/15 18:11 | 21,843,691 | N35.5456 E139.7720 |
| 1506 | IMG_0006.JPG | STILL IMAGE | 2012/06/15 19:22 | 6,444,334 | N/A |
| 1507 | IMG_0007.JPG | STILL IMAGE | 2012/06/16 09:54 | 5,115,486 | N35.6395 E139.8620 |
| 1508 | IMG_0008.JPG | STILL IMAGE | 2012/06/16 12:31 | 5,612,541 | N/A |
| 1509 | IMG_0009.JPG | STILL IMAGE | 2012/06/16 13:44 | 4,953,445 | N35.6410 E139.8599 |
| 1510 | MVI_0010.MOV | MOVING IMAGE | 2012/06/16 17:39 | 35,81,326 | N35.6439 E139.8571 |

FIG. 15B

| | FILE NAME | TYPE | IMAGING DATE AND TIME | SIZE | IMAGING PLACE |
|---|---|---|---|---|---|
| 1511 | IMG_0011.JPG | STILL IMAGE | 2012/06/13 13:13 | 5,342,455 | N/A |
| 1512 | IMG_0012.JPG | STILL IMAGE | 2012/06/15 11:44 | 4,753,678 | N/A |
| 1513 | MVI_0013.MOV | MOVING IMAGE | 2012/06/15 10:42 | 47,853,678 | N35.5456 E139.7730 |
| 1514 | IMG_0014.JPG | STILL IMAGE | 2012/06/15 14:22 | 5,264,224 | N/A |
| 1515 | MVI_0015.MOV | MOVING IMAGE | 2012/06/15 17:22 | 42,456,632 | N/A |

FIG. 16A

| FILE NAME | TYPE | IMAGING DATE AND TIME | SIZE | IMAGING PLACE |
|---|---|---|---|---|
| IMG_0007.JPG | STILL IMAGE | 2012/06/16 09:54 | 5,115,486 | N35.6395 E139.8620 |
| IMG_0009.JPG | STILL IMAGE | 2012/06/16 13:44 | 4,953,445 | N35.6410 E139.8599 |
| IMG_0001.JPG | STILL IMAGE | 2012/06/13 12:12 | 5,843,661 | N35.6226 E139.8367 |
| IMG_0002.JPG | STILL IMAGE | 2012/06/15 10:55 | 4,869,223 | N35.6240 E139.7687 |
| IMG_0004.JPG | STILL IMAGE | 2012/06/15 15:33 | 5,886,312 | N35.5821 E139.7425 |

| FILE NAME | TYPE | IMAGING DATE AND TIME | SIZE | IMAGING PLACE |
|---|---|---|---|---|
| IMG_0014.JPG | STILL IMAGE | 2012/06/15 14:22 | 5,246,224 | N/A |
| IMG_0012.JPG | STILL IMAGE | 2012/06/15 11:44 | 4,753,678 | N/A |
| IMG_0011.JPG | STILL IMAGE | 2012/06/13 13:13 | 5,342,455 | N/A |

1514 — IMG_0014.JPG row
1512 — IMG_0012.JPG row
1511 — IMG_0011.JPG row

FIG. 17A

```
<html>
<head><title>Thumbnail View </title></head>
<body>
<table>
<tr>
<td><a href="/sdcard/IMG_0007.JPG"><img src="/tmp/IMG_0007_THM.JPG"></a></td>
<td>IMG_0007.JPG</td>
<td>N35.6395<br>E139.8620</td>
</tr>
<tr>
<td><a href="/sdcard/IMG_0009.JPG"><img src="/tmp/IMG_0009_THM.JPG"></a></td>
<td>IMG_0009.JPG</td>
<td>N35.6410<br>E139.8599</td>
</tr>
<tr>
<td><a href="/sdcard/IMG_0001.JPG"><img src="/tmp/IMG_0001_THM.JPG"></a></td>
<td>IMG_0001.JPG</td>
<td>N35.6226<br>E139.8367</td>
</tr>
<tr>
<td><a href="/sdcard/IMG_0002.JPG"><img src="/tmp/IMG_0002_THM.JPG"></a></td>
<td>IMG_0002.JPG</td>
<td>N35.6240<br>E139.7687</td>
</tr>
<tr>
<td><a href="/sdcard/IMG_0004.JPG"><img src="/tmp/IMG_0004_THM.JPG"></a></td>
<td>IMG_0004.JPG</td>
<td>N35.5821<br>E139.7425</td>
</tr>
</table>
</body>
</html>
```

| | | | |
|---|---|---|---|
| WIRELESS LAN COMMUNICATION PARAMETER | SSID | MOBILE98765 | 1901 |
| | AUTHENTICATION/ENCRYPTION METHOD | WPA2-PSK(TKIP) | 1902 |
| | PASSPHRASE | AGAEGEGFSCVDSF | 1903 |
| | IP ADDRESS ASSIGNED TO MOBILE PHONE | 192.168.1.2 | 1904 |
| | NET MASK | 255.255.255.0 | 1905 |
| | GATEWAY | 192.168.1.1 | 1906 |
| | IP ADDRESS ASSIGNED TO DIGITAL CAMERA | 192.168.1.1 | 1907 |
| OPERATION STATE OF APPLICATION | APPLICATION TYPE | LOCATION | 1908 |
| | LOCATION | ABC AQUARIUM | 1909 |
| | DATA TYPE | STILL IMAGE DATA | 1910 |

FIG. 20

| NAME OF PLACE | LATITUDE/LONGITUDE |
|---|---|
| ⋮ | ⋮ |
| ABC AQUARIUM | N35.6400 E139.8622 |
| ABC FERRIS WHEEL | N35.6439 E139.8571 |
| ABC STATION | N35.6444 E138.8616 |
| ⋮ | ⋮ |

DATA PROCESSING APPARATUS, METHOD FOR CONTROLLING THE SAME, AND STORAGE MEDIUM

BACKGROUND OF THE INVENTION

Field of the Invention

The present invention relates to a data processing apparatus configured to communicate with other apparatuses, a method of controlling the same, and a storage medium.

Description of the Related Art

Conventionally, there has been known a function of a digital camera having a wireless communication function to communicate with a mobile phone or the like to exchange images. For example, Japanese Patent Application Laid-Open No. 2003-8816 discusses a system in which a digital camera and a mobile phone are connected to each other via wireless communication to send or receive image data selected by the user.

In recent years, the capacity of a storage medium that can be used in a digital camera has been increasing significantly. As a result, a storage medium can record a significantly large amount of contents.

In Japanese Patent Application Laid-Open No. 2003-8816, the increase in the capacity of a storage medium is not considered. Thus, depending on the amount of contents recorded in a storage medium, it may take time and effort to find contents that the user desires to send.

SUMMARY OF THE INVENTION

According to an aspect of the present invention, a data processing apparatus includes a recording control unit configured to perform control so that a plurality of contents is recorded in a recording medium, a first communication unit configured to connect to an external device via a first communication, and receive a communication parameter for connecting to the external device and information to be used to sort the plurality of contents via a second communication different from the first communication, a second communication unit configured to connect to the external device via the second communication based on the communication parameter received via the first communication unit, and a control unit configured to perform control so that the plurality of contents is sorted based on the information to be used to sort the plurality of contents that is received from the external device via the first communication unit.

Further features of the present invention will become apparent from the following description of exemplary embodiments with reference to the attached drawings.

BRIEF DESCRIPTION OF THE DRAWINGS

FIGS. 5A and 5B are flow charts respectively illustrating operations of a digital camera and operations of a mobile phone according to the first exemplary embodiment.

FIG. 6 is a table illustrating data to be sent by a digital camera according to the first exemplary embodiment.

FIG. 8 is a table illustrating data to be received by a digital camera according to the first exemplary embodiment.

FIG. 9 is a list illustrating image data stored in a storage medium according to the first exemplary embodiment.

FIGS. 10A and 10B are lists each illustrating a result of the sorting of image data stored in a storage medium according to the first exemplary embodiment.

FIG. 14 is a table illustrating data to be received by a data processing apparatus according to the second exemplary embodiment.

FIGS. 15A and 15B are lists each illustrating image data stored in a storage medium according to the second exemplary embodiment.

FIGS. 16A and 16B are lists each illustrating a result of the sorting of image data stored in a storage medium according to the second exemplary embodiment.

FIGS. 17A and 17B are diagrams each illustrating an example of Hypertext Mark-up Language (HTML) data generated by a data processing apparatus according to the second exemplary embodiment.

FIG. 19 is a table illustrating data to be received by a data processing apparatus according to the third exemplary embodiment.

FIG. 20 is a table illustrating a point-of-interest (POI) database stored in a nonvolatile memory of a data processing apparatus according to the third exemplary embodiment.

DESCRIPTION OF THE EMBODIMENTS

Hereinbelow, exemplary embodiments of the present invention will be described with reference to the attached drawings.

In a first exemplary embodiment, an example is described in which a data processing apparatus is a digital camera having near-field communication (NFC) and wireless local area network (LAN) functions. In the present exemplary embodiment, data processed by the data processing apparatus is image data (still image or moving image), and an apparatus that can communicate with the data processing apparatus is a mobile phone (smartphone) having NFC and wireless LAN functions.

<Description of Apparatuses>

Figure 1:
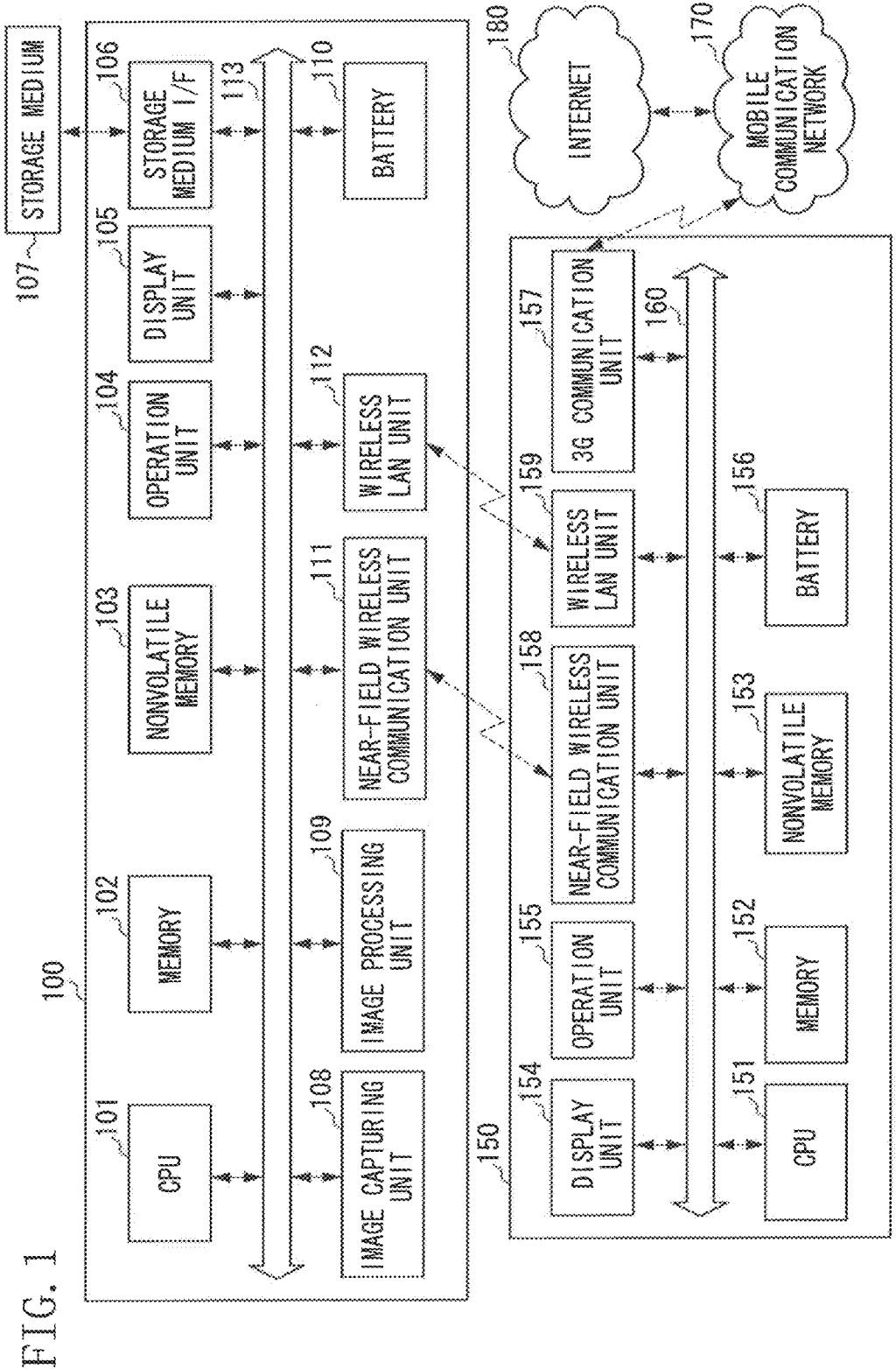
FIG. 1 is a block diagram illustrating a configuration of a communication system according to a first exemplary embodiment.

FIG. 1 is a block diagram illustrating a configuration of a communication system according to the first exemplary embodiment.

A mobile phone 150 can communicate with a digital camera 100 using the wireless LAN function. A mobile communication network 170 is a communication network provided by a mobile telecommunication provider. The mobile communication network 170 includes a large number of base stations, a network between the base stations, a gateway to the Internet, etc. The mobile phone 150 can communicate with other mobile phones and terminals on the Internet via the mobile communication network 170. The mobile communication network 170 is also connected to the Internet 180.

In the digital camera 100, a central processing unit (CPU) 101, a memory 102, a nonvolatile memory 103, an operation unit 104, a display unit 105, a storage medium interface (I/F) 106, an image capturing unit 108, an image processing unit 109, a battery 110, a near-field wireless communication unit 111, and a wireless LAN unit 112 are connected to a system bus 113.

The CPU 101 (sorting unit) controls the digital camera 100. The CPU 101 controls each unit of the digital camera 100 and records an image according to user settings and operations.

The memory 102 is a rewritable memory and used as a work area for a program used for controlling the digital camera 100. The memory 102 includes, for example, a random-access memory (RAM) (volatile memory using a semiconductor device), etc.

The nonvolatile memory 103 stores a program for controlling the digital camera 100 and data to be used by the program such as image data, audio data, and other data. When the power of the digital camera 100 is turned on, the CPU 101 reads a program from the nonvolatile memory 103 to start controlling the digital camera 100. The nonvolatile memory 103 includes, for example, a read-only memory (ROM) (nonvolatile memory using a semiconductor device), etc.

The operation unit 104 is used to give a user instruction to the digital camera 100 therethrough. The operation unit 104 includes a plurality of buttons, dials, etc.

The display unit 105 displays a screen including an image and a graphic user interface (GUI) based on the control performed by the CPU 101. The display unit 105 includes, for example, a liquid crystal display device (LCD) and a LCD driver unit configured to control the LCD. The CPU 101 controls each unit of the digital camera 100 according to the program to generate a display control signal, generate an image signal, and output the image signal to the display unit 105. The display unit 105 displays a video image based on the output image signal.

The storage medium I/F 106 is an interface for attaching a storage medium 107 such as a memory card. Based on the control by the CPU 101, the storage medium I/F 106 reads or writes data from or to the storage medium 107 attached to the storage medium I/F 106.

The storage medium 107 (data storage unit) is a rewritable, nonvolatile memory for storing captured image data. For example, a secure digital (SD) card, a CompactFlash (registered trademark) card, or the like is used as the storage medium 107.

An image capturing unit 108 converts an image (light) into an electric image signal based on the control by the CPU 101 and outputs the image signal to the system bus 113. The image capturing unit 108 includes, for example, an optical lens unit, an optical system for controlling a diaphragm, zoom, focus, etc., an image sensor for converting light (image) input via the optical lens unit into an electric image signal, etc. In general, a complementary metal-oxide-semiconductor (CMOS) image sensor using a CMOS or a charge-coupled device (CCD) image sensor using a CCD is used as the image sensor.

An image processing unit 109 performs various types of image processing on image data stored in the nonvolatile memory 103 or the storage medium 107 or an image signal output from the image capturing unit 108 based on the control by the CPU 101. The image processing to be performed by the image processing unit 109 includes analog to digital (A/D) conversion processing, digital to analog (D/A) conversion processing, image data encoding processing, compression processing, decoding processing, enlargement/reduction (resizing) processing, noise reduction processing, color conversion processing, face detection processing. The image processing unit 109 may include a dedicated circuit block for performing specific image processing. Further, depending on the type of image processing, the CPU 101 may perform image processing according to a program without the use of the image processing unit 109.

A battery 110 supplies power necessary for the digital camera 100 to operate. The battery 110 is a unit including a rechargeable secondary battery and can be charged by an external battery charger (not illustrated).

A near-field wireless communication unit 111 (first communication unit) is a communication unit for realizing contactless near-field communication. The near-field wireless communication unit 111 includes an antenna for wireless communication and a modulation/demodulation circuit and a communication controller for processing wireless signals. The near-field wireless communication unit 111 outputs a modulated wireless signal from the antenna or demodulates a wireless signal received by the antenna to realize contactless near-field communication according to the International Organization for Standardization/the International Electrotechnical Commission (ISO/IEC) 14443 or ISO/IEC 18092. In the present exemplary embodiment, when the near-field wireless communication unit 111 comes near to a near-field wireless communication unit 158 of the mobile phone 150, the near-field wireless communication unit 111 is used to detect whether the mobile phone 150 comes near to or moves away from the digital camera 100, to send and receive communication parameters to be used by the wireless LAN unit 112 and a wireless LAN unit 159, etc.

The wireless LAN unit 112 (second communication unit) is a communication unit for realizing longer-range wireless communication than that realized by the near-field wireless communication unit 111. The wireless LAN unit 112 includes an antenna for wireless communication and a communication controller for processing a wireless signal to realize wireless communication according to the Institute Of Electrical and Electronics Engineers, Inc. (IEEE) 802.11a/b/g/n. In the present exemplary embodiment, the wireless LAN unit 112 is used to carry out data communication with the mobile phone 150 and the wireless LAN unit 159 or the like.

The units connected to the system bus 113 can send and receive data to and from one another via the system bus 113.

In the mobile phone 150, a CPU 151, a memory 152, a nonvolatile memory 153, a display unit 154, an operation unit 155, a battery 156, a third-generation (3G) communication unit 157, a near-field wireless communication unit 158, and the wireless LAN unit 159 are connected to a system bus 160.

The CPU 151 controls the mobile phone 150. The CPU 151 controls each unit of the mobile phone 150 to conduct telephone calls, access data on the Internet, etc. according to user settings and operations.

The memory 152 is a rewritable memory and used as a work area for a program used for controlling the mobile phone 150. Further, the memory 152 is also used as a buffer for storing digital content data received from the 3G communication unit 157 or the wireless LAN unit 159 and image data to be displayed on the display unit 154. The memory 152 includes, for example, a RAM.

The nonvolatile memory 153 stores a program used for controlling the mobile phone 150 and data to be used by the program such as image data, text data, and other data. When the power of the mobile phone 150 is turned on, the CPU 151 reads a program from the nonvolatile memory 153 to start controlling the mobile phone 150. The nonvolatile memory 153 includes, for example, a ROM.

The display unit 154 displays a screen including an image and a GUI based on the control by the CPU 151. The display unit 154 includes, for example, a LCD and a LCD driver unit configured to control the LCD. The CPU 151 controls each unit of the mobile phone 150 according to the program to generate a display control signal, generate an image signal, and output the image signal to the display unit 154. The display unit 154 displays an image based on the output image signal.

The operation unit 155 is used to give a user instruction to the mobile phone 150 therethrough. The operation unit 155 includes a plurality of buttons and a touch panel. The operation unit 155 notifies the CPU 151 of the press of a button, coordinates information detected by the touch panel, etc.

The battery 156 supplies power necessary for the mobile phone 150 to operate. The battery 156 is a unit including a rechargeable secondary battery and can be charged by an external battery charger (not illustrated).

The 3G communication unit 157 controls audio and data communication between the mobile phone 150 and the mobile communication network 170. The 3G communication unit 157 includes an antenna for conducting wireless communication and a communication controller for processing a wireless signal to realize wireless communication according to Wideband Code Division Multiple Access (W-CDMA) (Universal Mobile Telecommunications System (UMTS)). In the present exemplary embodiment, the 3G communication unit 157 is connected to one of the base stations included in the mobile communication network 170 based on the control by the CPU 151, and conducts audio or data communication with another mobile phone connected to the mobile communication network 170, a terminal on the Internet 180.

The near-field wireless communication unit 158 is a communication unit for realizing contactless near-field communication. The near-field wireless communication unit 158 includes an antenna for wireless communication and a modulation/demodulation circuit and a communication controller for processing a wireless signal. The near-field wireless communication unit 158 outputs a modulated wireless signal from the antenna or demodulates a wireless signal received by the antenna to realize contactless near-field communication according to ISO/IEC 14443 or ISO/IEC 18092. In the present exemplary embodiment, when the near-field wireless communication unit 158 comes near to the near-field wireless communication unit 111 of the digital camera 100, the near-field wireless communication unit 158 is used to detect whether the digital camera 100 comes near to or moves away from the mobile phone 150, and to send and receive communication parameters to be used by the wireless LAN units 159 and 112.

The wireless LAN unit 159 is a communication unit for realizing longer-range wireless communication than that realized by the near-field wireless communication unit 158. The wireless LAN unit 159 includes an antenna for wireless communication and a communication controller for processing a wireless signal, and realizes wireless communication according to the IEEE 802.11a/b/g/n. In the present exemplary embodiment, the wireless LAN unit 159 is used to carry out data communication with the wireless LAN unit 112 of the digital camera 100 or the like.

The units connected to the system bus 160 can send and receive data to and from one another via the system bus 160.

Figure 2A:
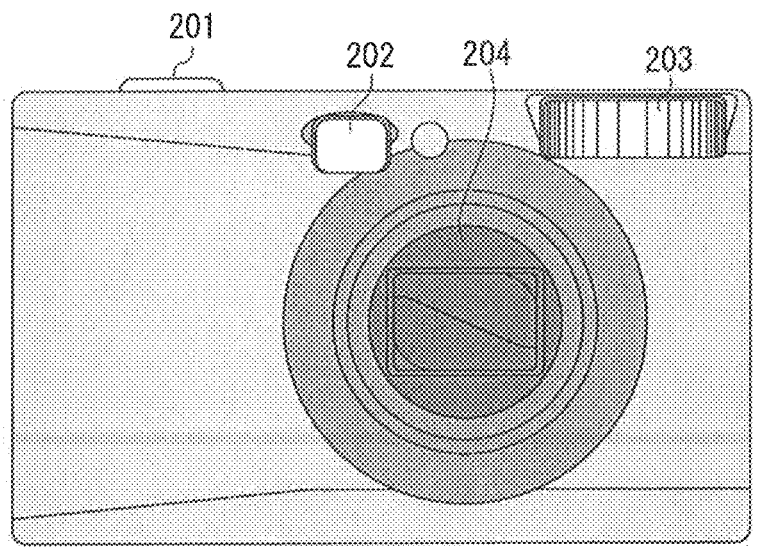
FIGS. 2A, 2B, and 2C are external views illustrating a digital camera according to the first exemplary embodiment.
Figure 2B:
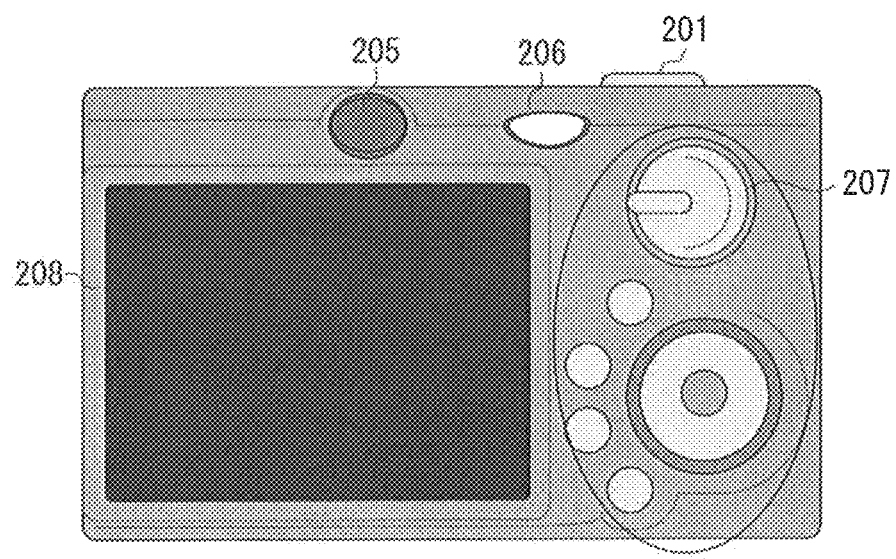
Figure 2C:
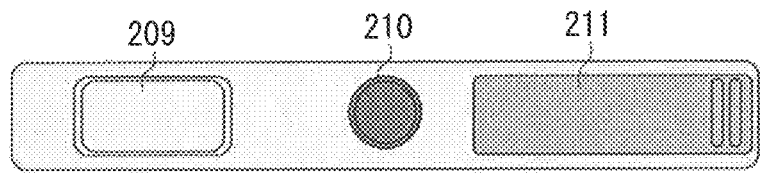

FIGS. 2A, 2B, and 2C are external views of the digital camera 100, illustrating a front view, a rear view, and a bottom view, respectively.

A shutter button 201 constitutes the operation unit 104. The shutter button 201 is a two-stage press switch capable of detecting a half-stroke state and a full-stroke state distinctively. The shutter button 201 starts the auto-focus control in the half-stroke state and starts an image capturing operation to capture still or moving image data in the full-stroke state. At the full press of the shutter button 201 during the capture of moving image data, the capturing of the moving image data is ended.

The digital camera 100 includes a viewfinder window 202, and the user can check an object image through a viewfinder eyepiece unit 205, which will be described below, to determine the composition during the image capturing.

A flash unit 203 emits light when necessary during the image capturing so that a still image can be captured clearly even under dark conditions.

An imaging lens 204 is included in the image capturing unit 108.

Through the viewfinder eyepiece unit 205, the user can optically check an object image.

A power button 206 is for turning on/off the power of the digital camera 100.

Buttons 207 constitute the operation unit 104. The user uses the buttons 207 to display a menu of the digital camera 100 or set various parameters. An LCD 208 constitutes the display unit 105. The LCD 208 is used to determine the image capturing range (determine the composition) before the start of the image capturing, displays an operation menu, which will be described below, or reproduces and displays captured image data.

A near-field wireless communication area 209 is for conducting near-field wireless communication. The antenna of the near-field wireless communication unit 111 is provided in the near-field wireless communication area 209. When the antenna of the near-field wireless communication unit 158 of the mobile phone 150 is brought near to the near-field wireless communication area 209, the near-field wireless communication unit 111 and the near-field wireless communication unit 158 become capable of communicating with each other.

A tripod socket hole 210 is a screw hole for fixing a tripod.

The battery 110 and the storage medium 107 can be attached to a battery room 211.

Figure 3A:
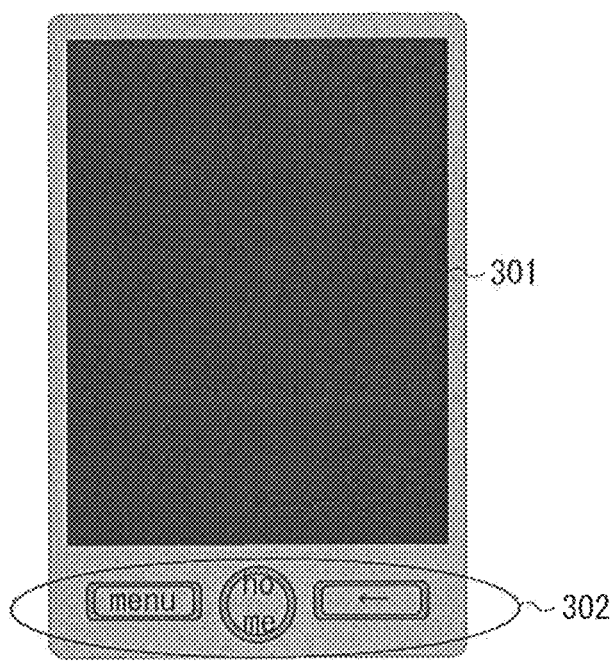
FIGS. 3A, 3B, and 3C are external views illustrating a mobile phone according to the first exemplary embodiment.
Figure 3B:
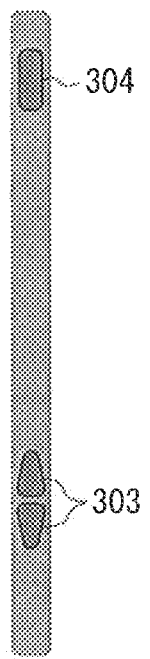
Figure 3C:
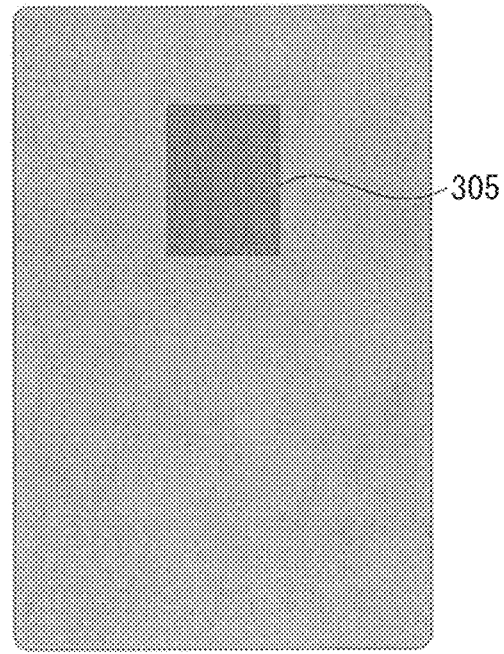

FIGS. 3A, 3B, and 3C are external views of the mobile phone 150, illustrating a front view, a side view, and a back view, respectively.

A touch panel-attached liquid crystal display 301 includes a touch panel unit and a liquid crystal display unit. The touch panel unit constitutes the operation unit 155, and the liquid crystal display unit constitutes the display unit 154. The user uses the touch panel unit to operate a GUI displayed on the touch panel-attached liquid crystal display 301.

Operation buttons 302 constitute the operation unit 155. The user uses the operation buttons 302 to switch a function of the mobile phone 150, or operate a GUI displayed on the display unit 154.

Volume buttons 303 constitute the operation unit 155. The user uses the volume buttons 303 to control the volume during audio communication.

A power button 304 is used to turn on/off the power of the mobile phone 150.

A near-field wireless communication area 305 is for conducting near-field wireless communication. The antenna of the near-field wireless communication unit 158 is provided in the near-field wireless communication area 305. When the antenna of the near-field wireless communication unit 111 of the digital camera 100 is brought near to the near-field wireless communication area 305, the near-field wireless communication unit 158 and the near-field wireless communication unit 111 become capable of communicating with each other.

Figure 4A:
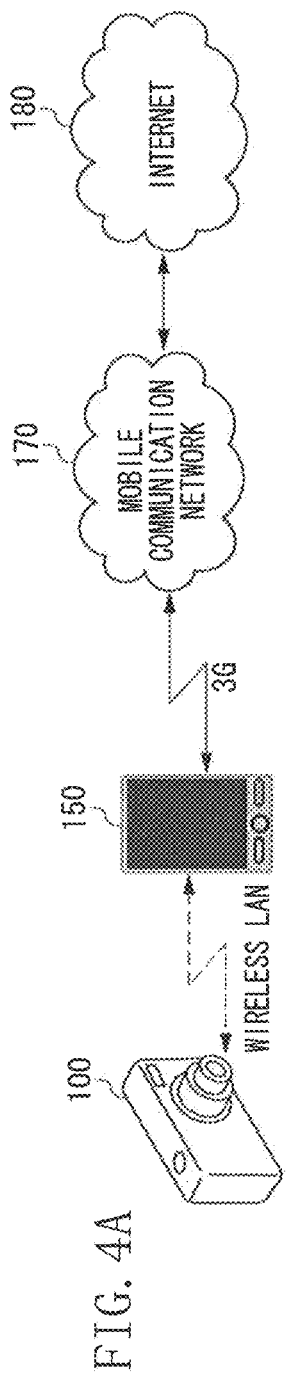
FIGS. 4A, 4B, and 4C each illustrate a connection relationship (network configuration) between a digital camera, a mobile phone, a mobile communication network, and the Internet.
Figure 4B:
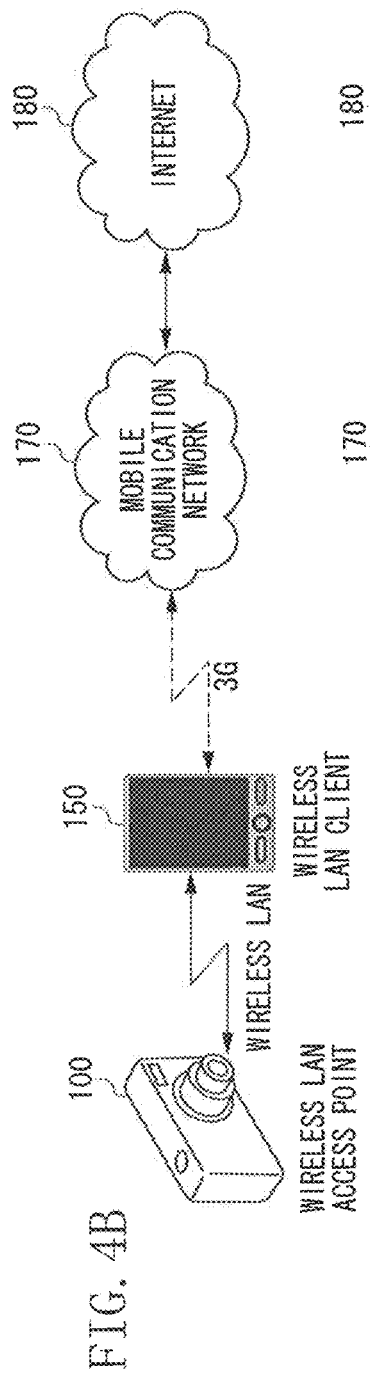
Figure 4C:
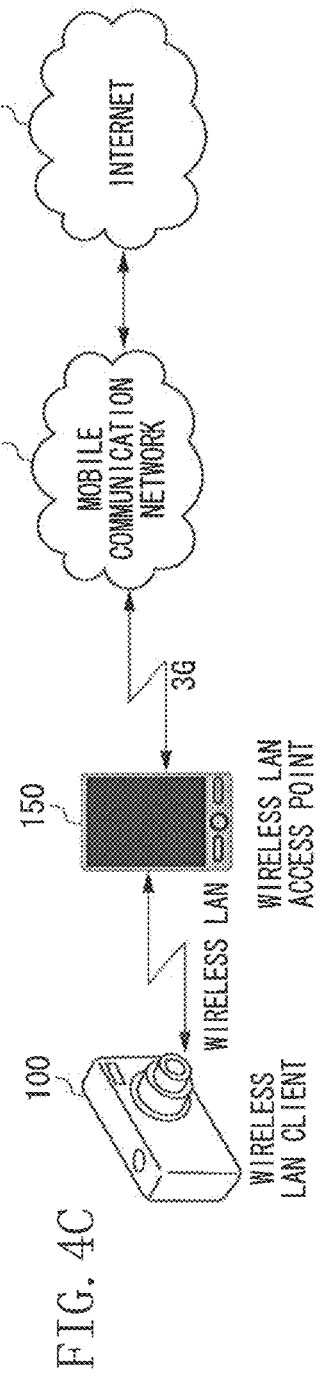

FIGS. 4A, 4B, and 4C each illustrate a connection relationship (network configuration) between the digital camera 100, the mobile phone 150, the mobile communication network 170, and the Internet 180. In the present exemplary embodiment, the description is limited to not audio communication but data communication. In a communication system using the digital camera 100, the network configurations are established as necessary to carry out communication. First, the network configurations will be described, and timings of configuring the network configurations will be described in the section "Description of operations" below with reference to flow charts illustrated in FIGS. 5A and 5B.

FIG. 4A illustrates a state in which the digital camera 100 and the mobile phone 150 are not in wireless LAN communication with each other. Accordingly, the digital camera 100 and the mobile phone 150 cannot communicate with each other. In this state, the mobile phone 150 is connected to the mobile communication network 170 using the 3G communication unit 157.

FIG. 4B is a diagram illustrating a state in which the digital camera 100 becomes a wireless LAN access point and the mobile phone 150 is connected as a wireless LAN client to the digital camera 100. Accordingly, the digital camera 100 and the mobile phone 150 can communicate with each other. Since the mobile phone 150 cannot simultaneously conduct communication as a wireless LAN client and 3G data communication, in this state, the mobile phone 150 cannot conduct data communication with the mobile communication network 170.

FIG. 4C will be described below in a second exemplary embodiment.

<Description of Operations>

Now, operations of the digital camera 100 and the mobile phone 150 according to the present exemplary embodiment will be described with reference to flow charts illustrated in FIGS. 5A and 5B, and FIGS. 6 to 11. At the start point in the flow chart in FIG. 5A or 5B, the connection configuration of the digital camera 100 and the mobile phone 150 is as illustrated in FIG. 4A.

The operations of the digital camera 100 will be described in detail with reference to the flow chart illustrated in FIG. 5A. FIG. 5A is a flow chart illustrating the communication processing of the digital camera 100. This flow chart is executed in the background in parallel with image capturing processing and GUI processing.

In step S501, the CPU 101 monitors the state of the near-field wireless communication unit 111 to determine whether the near-field wireless communication unit 111 can communicate with the near-field wireless communication unit 158 of the mobile phone 150. Specifically, the near-field wireless communication unit 111 can communicate with the near-field wireless communication unit 158 when the near-field wireless communication area 209 of the digital camera 100 and the near-field wireless communication area 305 of the mobile phone 150 are close enough to communicate. If the near-field wireless communication unit 111 can communicate with the near-field wireless communication unit 158 (YES in step S501), the processing proceeds to step S502.

In step S502, the CPU 101 sends various types of parameters for communication between the wireless LAN units 112 and 159, by using the near-field wireless communication unit 111. Data sent in step S502 is received by the mobile phone 150 in step S552, which will be described below. FIG. 6 schematically illustrates data sent in step S502.

A service set identifier (SSID) 601 is an SSID of an access point in a case where the wireless LAN unit 112 of the digital camera 100 operates as the access point.

An authentication/encryption method 602 is an authentication/encryption method used to connect to the wireless LAN unit 112. Wi-Fi Protected Access 2-Pre-Shared Key (WPA2-PSK) (temporal key integrity protocol (TKIP)), Wired Equivalent Privacy (WEP), or the like is used.

A passphrase 603 is a passphrase used in an encryption method specified by the authentication/encryption method 602. An Internet Protocol (IP) address 604 is an IP address to be assigned to the wireless LAN unit 159 of the mobile phone 150.

A net mask value 605 is the value of a net mask set to the wireless LAN unit 159 of the mobile phone 150. An IP address 606 is a default gateway IP address set to the wireless LAN unit 159 of the mobile phone 150.

An IP address 607 is an IP address assigned to the wireless LAN unit 112 of the digital camera 100. The mobile phone 150 having received the data illustrated in FIG. 6 (the mobile phone 150 receives the data in step S552 described below) uses the IP address 607 to communicate with the digital camera 100.

Returning to FIG. 5A, in step S503, the CPU 101 attempts to acquire an operation status of an application in the mobile phone 150 via the near-field wireless communication unit 111. Data received in step S503 is data sent by the mobile phone 150 in step S553, which will be described below. In the NFC state, there may be a case where the operation status of the application in the mobile phone 150 cannot be acquired in step S503.

Now, the data to be received in step S503 will be described with reference to FIGS. 7A, 7B, and 8.

Figure 7A:
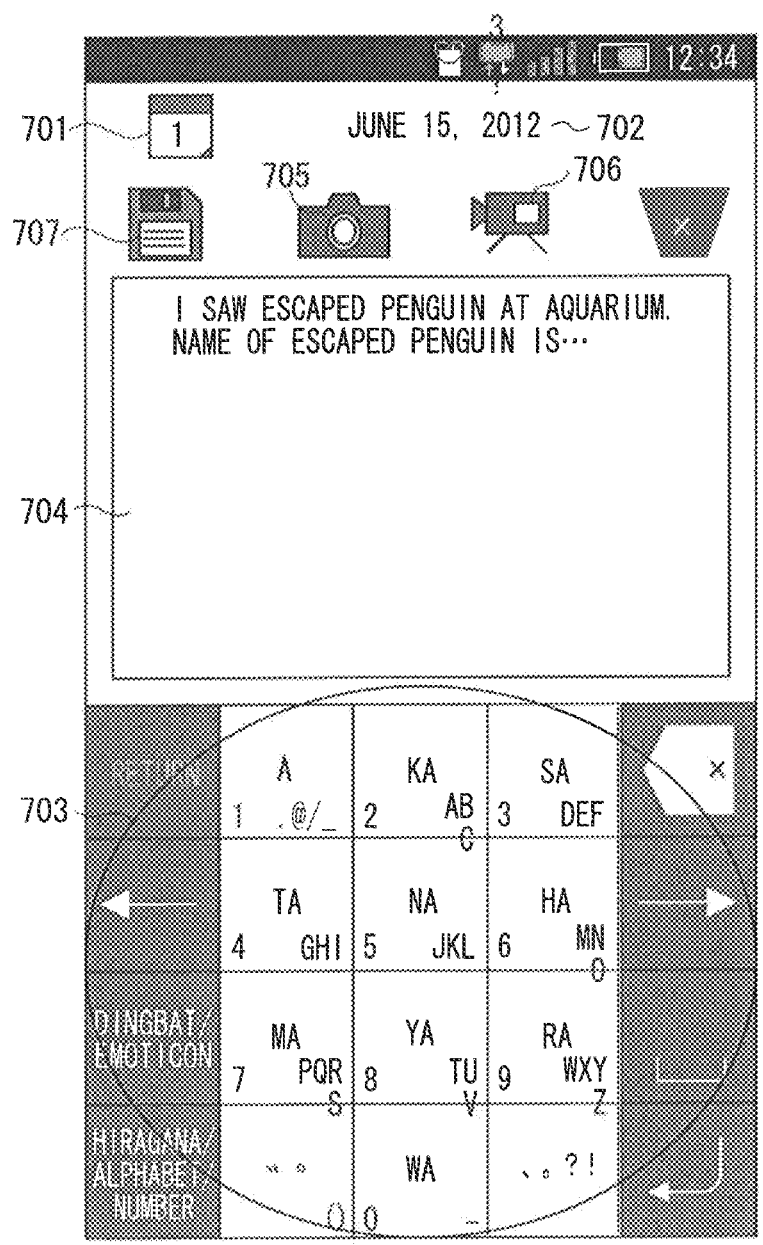
FIGS. 7A and 7B each illustrate a screen displayed on a mobile phone according to the first exemplary embodiment.
Figure 7B:
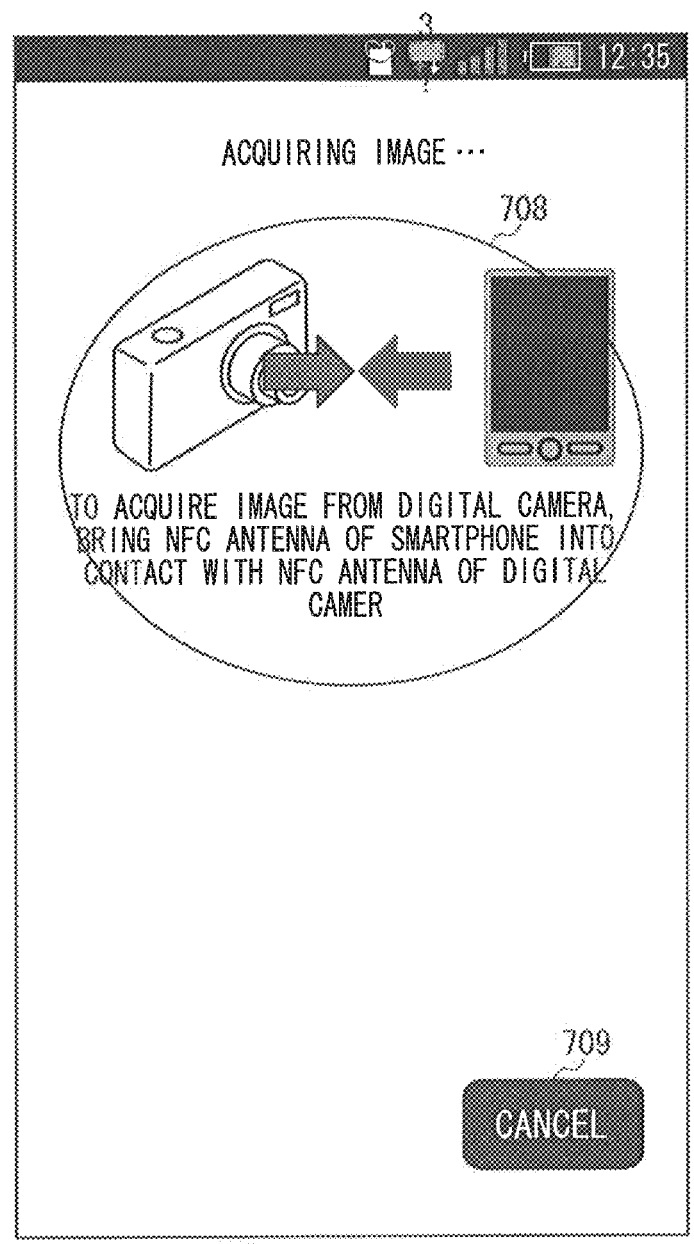

FIGS. 7A and 7B each illustrate details of a screen displayed on the display unit 154 of the mobile phone 150. FIG. 7A illustrates a screen displayed on the display unit 154 by an application running on the mobile phone 150. The application running on the mobile phone 150 is an application for inputting a diary.

When a calendar icon 701 is touched by the user, a time/date selection screen (not illustrated) is displayed, and the user can select the time and date of a diary to be input.

An area 702 is an area for displaying the time and date of a diary to be input. The time and date selected using the calendar icon 701 are displayed. The time and date may be the current or past time and date.

An area 703 is an area of icons for inputting text. The user inputs characters one by one by touching or flicking an icon related to a character that the user desires to input.

In a diary input area 704, the user can input a string of characters that the user desires to record as a diary by use of the icons in the area 703.

A camera icon 705 is for attaching a still image to a diary. When the user touches the camera icon 705, the screen is switched to the screen illustrated in FIG. 7B for acquiring still image data for a diary from an external digital camera.

A video icon 706 is for attaching a moving image to a diary. When the user touches the video icon 706, the screen is switched to the state for acquiring moving image data for a diary from an external video camera.

A save icon 707 is for saving an input diary. When the user touches the save icon 707, a string of characters input to the diary input area 704, still image data selected using the camera icon 705, and/or moving image data selected using the video icon 706 are saved as a diary of the time and date selected using the calendar icon 701.

FIG. 7B illustrates a screen displayed on the display unit 154 for acquiring still image data for a diary.

A graphic 708 is for prompting the user to bring the digital camera 100 and the mobile phone 150 close to each other so that the digital camera 100 and the mobile phone 150 can communicate with each other by near-field wireless communication.

An icon 709 is for canceling the acquisition of still image data for a diary. When the user touches the icon 709, the screen returns to the screen display illustrated in FIG. 7A.

FIG. 8 schematically illustrates data to be acquired by the CPU 101 in step S503. An application type 801 is the type of an application running on the mobile phone 150. In the case of the diary input application illustrated in FIG. 7, the application type 801 is "diary/blog".

Time/date 802 is the time and data focused by the application running on the mobile phone 150. In the example illustrated in FIG. 7A, the time/date 802 is the time and date specified in the area 702.

A data type 803 is the type of data intended to be acquired by the application running on the mobile phone 150. In a case where the camera icon 705 in FIG. 7A is touched, the data type 803 is "still image". In a case where the video icon 706 is touched, the data type 803 is "moving image".

Returning to FIG. 5A, in step S504, the CPU 101 starts initialization to use the wireless LAN unit 112. In general, it takes several seconds for the wireless LAN function to be initialized and ready to be used. Thus, in the flow chart in FIG. 5A, the processing proceeds to the subsequent step, i.e., step S505, without waiting for the completion of the initialization of the wireless LAN unit 112.

In step S505, the CPU 101 determines whether the operation status (FIG. 8) of the application is successfully acquired in step S503. If the operation status is successfully acquired (YES in step S505), the processing proceeds to step S506. If the acquisition of the operation status is failed (NO in step S505), the processing proceeds to step S508.

In step S506, the CPU 101 determines conditions for sorting image data stored in the storage medium 107 according to the data received in step S503. For example, in a case where the data illustrated in FIG. 8 is received in step S503, the CPU 101 determines the sort conditions as follows.
(a) Since the data type 803 is "still image data", only still image data in the storage medium 107 is to be sorted.
(b) Since the application type 801 is "diary/blog", the date of the image data is determined to be an important factor in user selection. Then, pieces of the image data that are older than the time and date specified by the time/date 802 are sorted in reverse chronological order, and then the remaining pieces of image data (i.e., pieces of image data that are newer than the specified time and date) are sorted in chronological order.

Since what the user desires to record as a diary is likely an event that occurred before the time and date of the diary, it can be expected that pieces of the image data that relate to the diary will be gathered at the top thereof as a result of the sort performed as described above.

In step S507, the CPU 101 sorts the image data according to the sort conditions determined in step S505.

Now, the details of the operation performed in step S506 will be described with reference to the examples illustrated in FIGS. 9 and 10A.

FIG. 9 illustrates image data stored in the storage medium 107. In this example, ten pieces of image data are stored in the storage medium 107. In a case where the data received in step S503 is the data illustrated in FIG. 8, the CPU 101 first determines still image data 901, 902, 904, 906, 907, 908, and 909 as data to be sorted. Then, the CPU 101 sorts the still image data 901, 902, and 904, which are older than the time and date 2012/06/15 18:33, in reverse chronological order. As a result, the CPU 101 sorts the still image data 904, 902, and 901 in this order. Lastly, the CPU 101 sorts the remaining pieces of still image data 906, 907, 908, and 909 in chronological order. As a result, the CPU 101 sorts the still image data 906, 907, 908, and 909 in this order.

FIG. 10A illustrates a sorted result of the image data. As illustrated in FIG. 10A, the sorted result is the still image data 904, 902, 901, 906, 907, 908, and 909 in this order. A column 1001 illustrated in FIG. 10A will be described below in step S513.

Returning to FIG. 5A, in step S508, the CPU 101 sorts the image data in reverse chronological order.

FIG. 10B illustrates a sorted result of the image data. As illustrated in FIG. 10B, the sorting result is the image data 910, 909 . . . and 901 in this order. The column 1001 illustrated in FIG. 10B will be described below in step S513.

Returning to FIG. 5A, in step S509, the CPU 101 waits for completion of the initialization of the wireless LAN unit 112 that is executed in step S504. When the initialization of the wireless LAN unit 112 is completed and the change of settings of the wireless LAN unit 159 in step S556, which will be described below, is completed (YES in step S509), the digital camera 100 and the mobile phone 150 can communicate with each other via the wireless LAN. At this time, the connection configuration is as illustrated in FIG. 4B.

In step S510, the CPU 101 monitors data received by the wireless LAN unit 112 and waits for the mobile phone 150 to start the Picture Transfer Protocol Over IP (PTP/IP) connection. When the CPU 101 determined that the mobile phone 150 has started the PTP/IP connection (YES in step S510), the processing proceeds to step S511. Otherwise (NO in step S510), the CPU 101 repeats the processing in step S510.

In step S511, the CPU 101 analyzes a PTP command received by the wireless LAN unit 112 and executes processing corresponding to the received command in steps S512 to S516.

The processing to be performed in step S512 is the processing to be executed in a case where a session start command (OpenSession command) is received in step S511. In response to the session start command, the CPU 101 performs internal processing for executing subsequent PTP commands (e.g., securing of internal memory, exclusive control for not accepting PTP commands from a device other than the mobile phone 150, etc.). Thereafter, the CPU 101 sends data indicating that the command is successfully accepted to the mobile phone 150 via the wireless LAN unit 112. When this processing is completed, the processing returns to step S511, and the CPU 101 waits for a next PTP command.

The processing to be performed in step S513 is the processing to be executed in a case where an image list acquisition command (GetObjectHandles command) is received in step S511. In response to the image list acquisition command, the CPU 101 assigns a unique number (ObjectHandle) to the image data to be sent to the mobile phone 150, and sends a list of the numbers to the mobile phone 150 via the wireless LAN unit 112. At this time, the CPU 101 allocates the ObjectHandle in the order according to the sort result in step S507 or S508 (column 1001 in FIG. 10). When the processing is completed, the processing returns to step S511, and the CPU 101 waits for a next PTP command.

The processing to be performed in step S514 is the processing to be performed in a case where a thumbnail acquisition command (GetThumb command) is received in step S511. The ObjectHandle corresponding to the image data a thumbnail of which is desired to be acquired is attached as a parameter to the thumbnail acquisition command. The CPU 101 identifies image data from the ObjectHandle by use of the column 1001 in FIG. 10 and sends thumbnail data of the image data to the mobile phone 150 via the wireless LAN unit 112. When the processing is completed, the processing returns to step S511, and the CPU 101 waits for a next PTP command.

The processing to be performed in step S515 is the processing to be performed in a case where an image data acquisition command (GetObject command) is received in step S511. The ObjectHandle corresponding to the image data that is desired to be acquired is attached as a parameter to the image data acquisition command. The CPU 101 identifies the image data from the ObjectHandle by use of the column 1001 in FIG. 10, and sends the image data to the mobile phone 150 via the wireless LAN unit 112. When the processing is completed, the processing returns to step S511, and the CPU 101 waits for a next PTP command.

The processing to be performed in step S516 is the processing to be performed in a case where a session end command (CloseSession command) is received in step S511. In response to the session end command, the CPU 101 releases resources such as a memory used for executing the PTP commands, and sends data indicating that the command is successfully accepted to the mobile phone 150 via the wireless LAN unit 112.

In step S517, the CPU 101 disables the wireless LAN unit 112 and ends the flow chart.

While the CPU 101 can process commands other than the PTP commands described above in steps S511 to S516, the description thereof is omitted because there is no direct relationship with the present exemplary embodiment.

Figure 5B:
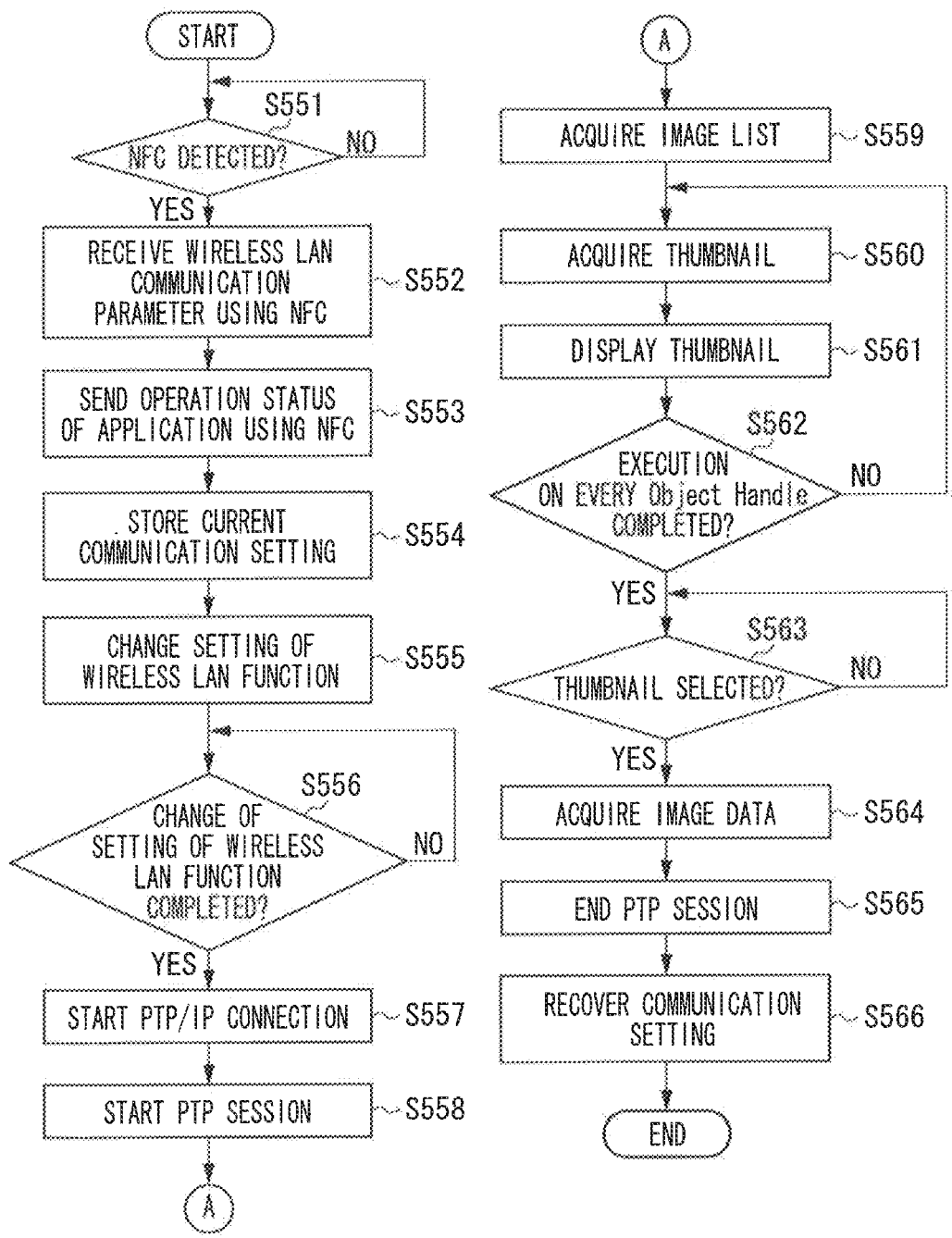

Next, the operations of the mobile phone 150 will be described in detail with reference to the flow chart illustrated in FIG. 5B.

In step S551, the CPU 151 monitors the state of the near-field wireless communication unit 158 to determine whether the near-field wireless communication unit 158 can communicate with the near-field wireless communication unit 111 of the digital camera 100. Specifically, the near-field wireless communication unit 158 can communicate with the near-field wireless communication unit 111 when the near-field wireless communication area 209 of the digital camera 100 and the near-field wireless communication area 305 of the mobile phone 150 are close enough to communicate. If the near-field wireless communication unit 158 can communicate with the near-field wireless communication unit 111 (YES in step S551), the processing proceeds to step S552. Step S551 corresponds to step S501.

In step S552, the CPU 151 receives various types of parameters (FIG. 6) for communication between the wireless LAN units 112 and 159 by use of the near-field wireless communication unit 158. The data to be received in step S552 is sent by the digital camera 100 in step S502.

In step S553, the CPU 151 sends an operation status (FIG. 8) of an application in the mobile phone 150 by use of the near-field wireless communication unit 158. The data sent in step S553 is received by the digital camera 100 in step S503.

In step S554, the CPU 151 stores current communication settings of the mobile phone 150 in the memory 15. Examples of information to be stored include whether data communication by the 3G communication unit 157 is enabled, whether data communication by the wireless LAN unit 159 is enabled, SSID used in the wireless LAN unit 159, encryption method, passphrase, and the like.

In step S555, the CPU 151 changes the settings of the wireless LAN unit 159 according to the communication parameters received in step S552.

In step S556, the CPU 151 waits for completion of the change of the settings of the wireless LAN unit 159 that is executed in step S555. When the CPU 151 determines that the change of the settings is completed, the processing proceeds to step S557. Otherwise (NO in step S556), the processing in step S556 is repeated.

In step S557, the CPU 151 communicates with the digital camera 100 by use of the wireless LAN unit 159 and starts PTP/IP connection. A PTP/IP connection start request sent in step S557 is processed by the digital camera 100 in step S510.

In step S558, the CPU 151 sends a session start command (OpenSession command) by use of the wireless LAN unit 159 so that the digital camera 100 becomes ready to process a PTP command. The session start command sent in step S558 is received by the digital camera 100 in step S511, and a response received in step S558 is sent by the digital camera 100 in step S512.

In step S559, the CPU 151 sends an image list acquisition command (GetObjectHandles command) by use of the wireless LAN unit 159. The CPU 151 acquires from a response received by the wireless LAN unit 159 a list (column 1001 in FIG. 10) of ObjectHandle of image data that can be acquired from the digital camera 100. The image list acquisition command sent in step S559 is received by the digital camera 100 in step S511, and the response received in step S559 is sent by the digital camera 100 in step S513.

In step S560, the CPU 151 sends a thumbnail acquisition command (GetThumb command) by use of the wireless LAN unit 159 while sequentially designating the ObjectHandle acquired in step S559. The CPU 151 acquires from the response received by the wireless LAN unit 159 the thumbnail data of an image designated by the ObjectHandle. The command sent in step S560 is received by the digital camera 100 in step S511, and the response received in step S560 is sent by the digital camera 100 in step S514.

In step S561, the CPU 151 places in a tile arrangement and displays the thumbnail data acquired in step S560 as a GUI on the display unit 154. The GUI displayed on the display unit 154 will be described below.

Figure 11:
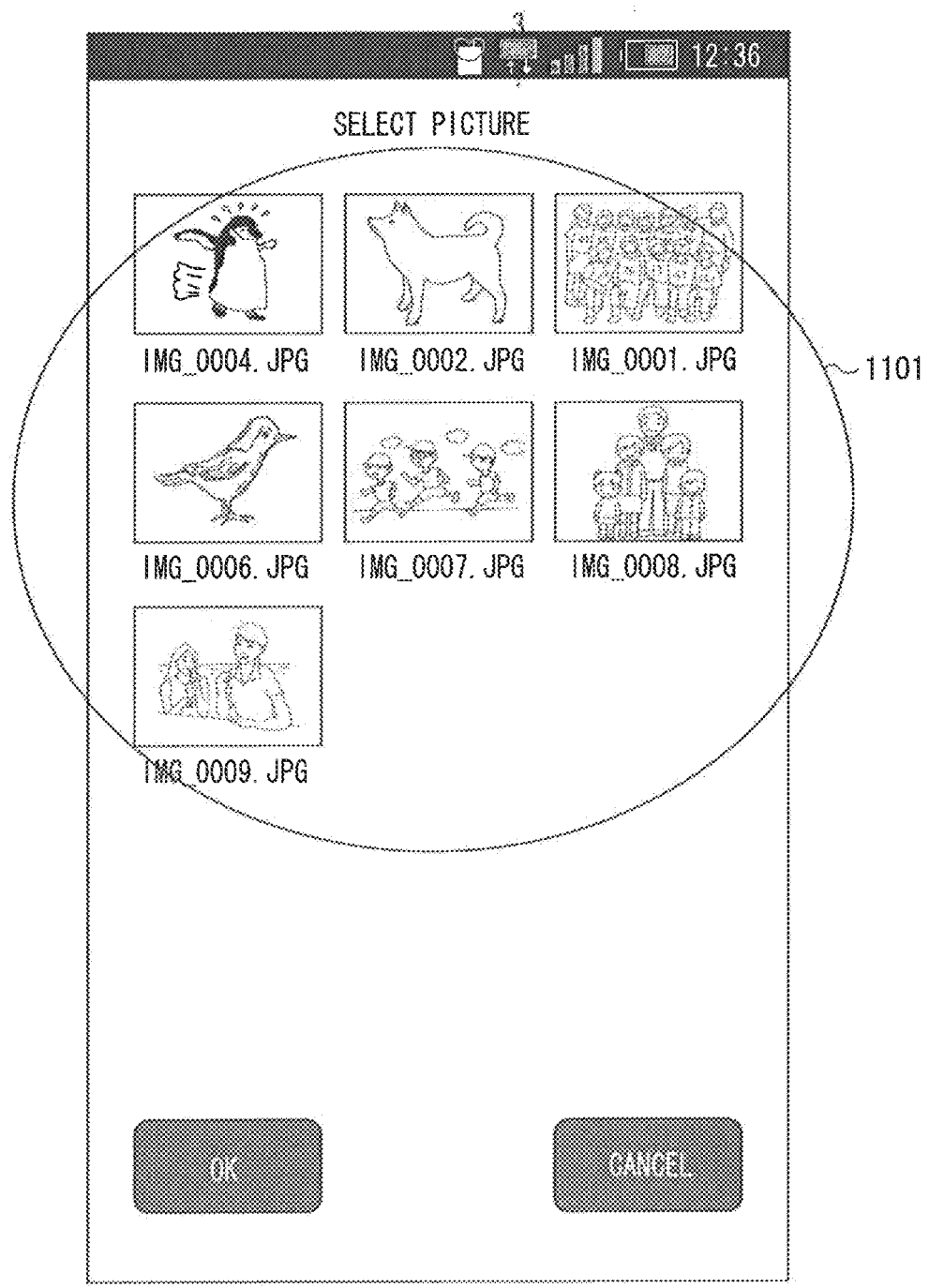
FIG. 11 illustrates an example of a thumbnail data display on a display unit of a mobile phone according to the first exemplary embodiment.

In step S562, the CPU 151 determines whether the processing in step S561 is executed on every ObjectHandle acquired in step S559. If the processing in step S561 is executed on every ObjectHandle (YES in step S562), the processing proceeds to step S563. If there is any ObjectHandle that has not been subjected to the processing in step S561 (NO in step S562), the processing returns to step S560. FIG. 11 illustrates an example of the thumbnail data display on the display unit 154 as a result of the processing performed in steps S560 to S562. The CPU 151 places and displays in a tile arrangement the thumbnail data acquired in step S560 from the upper left to the lower right so that the user can see the images in the digital camera 100 at once. Further, the thumbnail data is displayed in the order in the image list acquired in step S559 so that a thumbnail image of an image at the top of the image list is displayed at the upper left position, which is easily noticed by the user. More specifically, the image at the top of the sort result executed in step S507 or S508 is positioned at the upper left of the thumbnail images.

Returning to FIG. 5B, in step S563, the CPU 151 determines whether any of the thumbnail images in FIG. 11 is touched by use of the operation unit 155. If any of the thumbnail data is selected (YES in step S563), the processing proceeds to step S564.

In step S564, the CPU 151 sends an image data acquisition command (GetObject command) by use of the wireless LAN unit 159 while designating the ObjectHandle of the thumbnail data selected in step S563. The CPU 151 acquires from the response received by the wireless LAN unit 159 the image data designated by the ObjectHandle. The command sent in step S564 is received by the digital camera 100 in step S511, and the response received in step S564 is sent by the digital camera 100 in step S515.

In step S565, the CPU 151 sends a communication end command (CloseSession command) by use of the wireless LAN unit 159, and confirms from a response received by the wireless LAN unit 159 that the communication is completed normally. The command sent in step S565 is received by the digital camera 100 in step S511, and the response received in step S565 is sent by the digital camera 100 in step S516.

In step S566, the CPU 151 recovers the communication setting saved in step S554. At this time, the connection configuration is as illustrated in FIG. 4A.

While the CPU 151 can execute commands other than the PTP commands described above in steps S558 to S565, the description thereof is omitted because there is no direction relation with the present exemplary embodiment.

As described above, in the digital camera 100 storing a plurality of pieces of data, before the plurality of pieces of data is sent, they are sorted based on information acquired in advance, whereby the burden of data selection can be reduced.

As in the first exemplary embodiment, in a second exemplary embodiment, an example is described in which a data processing apparatus according to the present exemplary embodiment is a digital camera having NFC and wireless LAN functions. In the present exemplary embodiment, data processed by the data processing apparatus is image data (still image or moving image), and an apparatus that can communicate with the data processing apparatus is a mobile phone (smartphone) having the NFC and wireless LAN functions.

<Description of Apparatuses>

A digital camera 100 and a mobile phone 150 according to the present exemplary embodiment are similar to those in the first exemplary embodiment. Therefore, the description thereof is omitted. FIGS. 2A, 2B, 2C, 3A, 3B, 3C, and 4A are also similar to those in the first exemplary embodiment.

Now, FIG. 4C is described. FIG. 4C illustrates a state in which the mobile phone 150 becomes a wireless LAN access point and the digital camera 100 connects as a wireless LAN client to the mobile phone 150. Accordingly, the digital camera 100 and the mobile phone 150 can communicate with each other. Since the mobile phone 150 can simultaneously perform communication as a wireless LAN access point and 3G data communication, in this state, the mobile phone 150 can also perform data communication with the mobile communication network 170.

<Description of Operations>

The operations of the digital camera 100 and the mobile phone 150 according to the present exemplary embodiment will be described with reference to the flow charts illustrated in FIGS. 12A and 12B, and FIGS. 13A to 18B. At the beginning of the flow chart in FIGS. 12A and 12B, the connection configuration of the digital camera 100 and the mobile phone 150 is as illustrated in FIG. 4A.

Figure 12A:
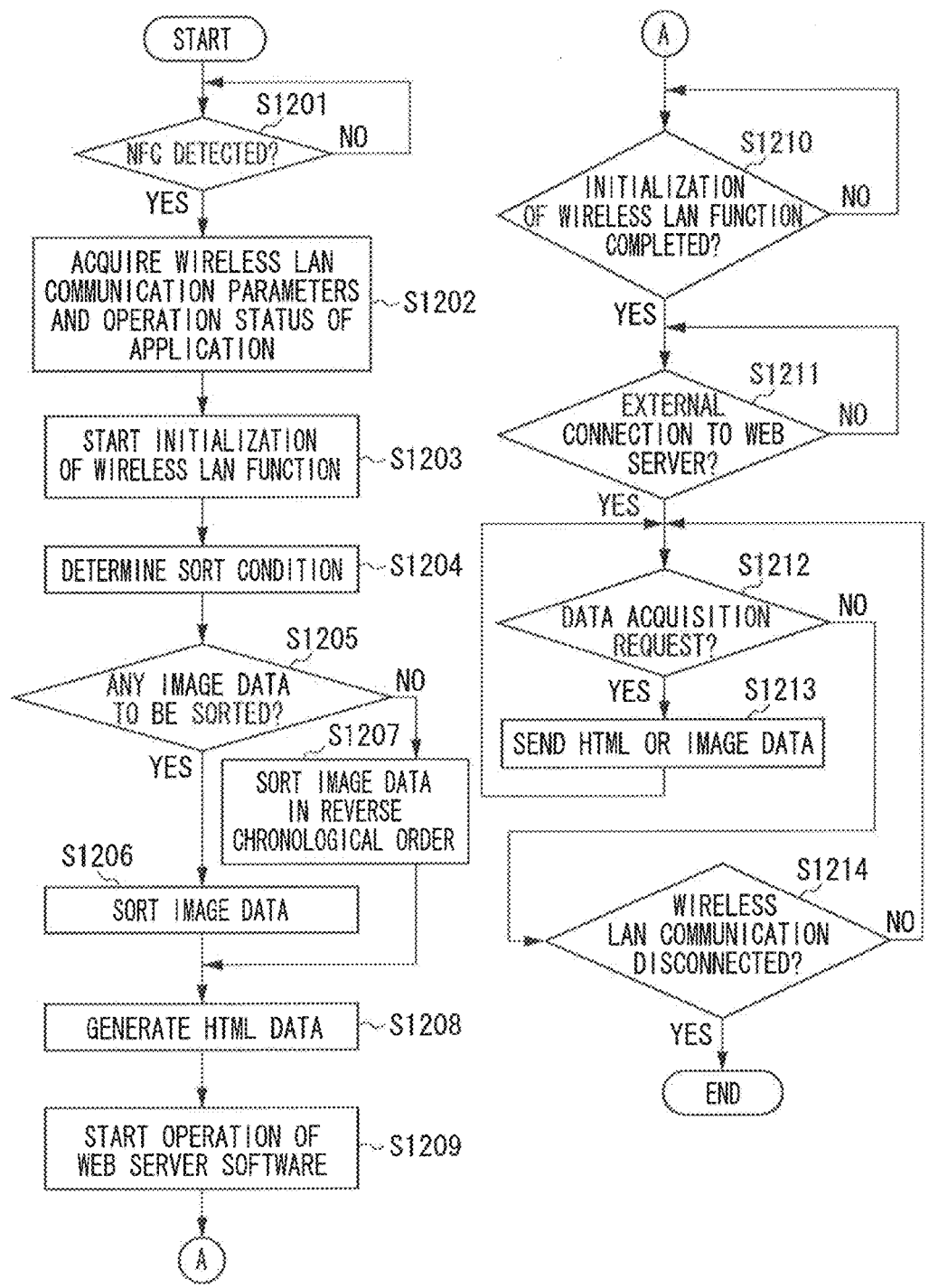
FIGS. 12A and 12B are flow charts respectively illustrating operations of a digital camera and operations of a mobile phone according to the second exemplary embodiment.

The operations of the digital camera 100 will be described in detail with reference to the flow chart in FIG. 12A. FIG. 12A is a flow chart relating to communication processing of the digital camera 100. The flow chart in FIG. 12A is executed in the background in parallel with imaging processing and GUI processing. In step S1201, the CPU 101 monitors the state of the near-field wireless communication unit 111 to determine whether the near-field wireless communication unit 111 can communicate with the near-field wireless communication unit 158 of the mobile phone 150. Specifically, the near-field wireless communication unit 111 can communicate with the near-field wireless communication unit 158 when the near-field wireless communication area 209 of the digital camera 100 and the near-field wireless communication area 305 of the mobile phone 150 are close enough to communicate. If the near-field wireless communication unit 111 can communicate with the near-field wireless communication unit 158 (YES in step S1201), the processing proceeds to step S1202.

In step S1202, the CPU 101 acquires various types of parameters for communication between the wireless LAN units 112 and 159 and an operation status of an application in the mobile phone 150 by using the near-field wireless communication unit 111. Data received in step S1202 is sent by the mobile phone 150 in step S1252, which will be described below.

The data received in step S1202 will be described with reference to FIGS. 13A, 13B, and 14.

Figure 13A:
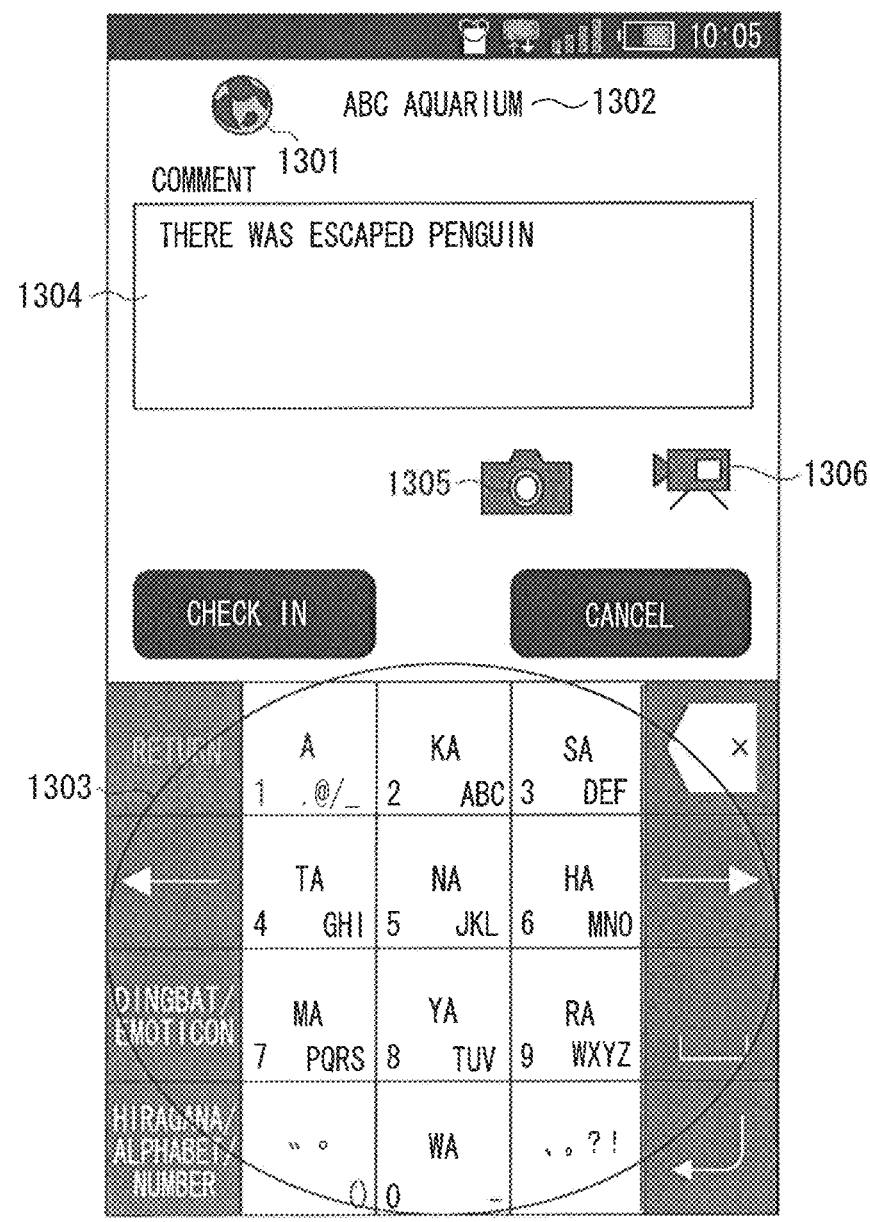
FIGS. 13A and 13B each illustrate a screen displayed on a mobile phone according to the second exemplary embodiment.
Figure 13B:
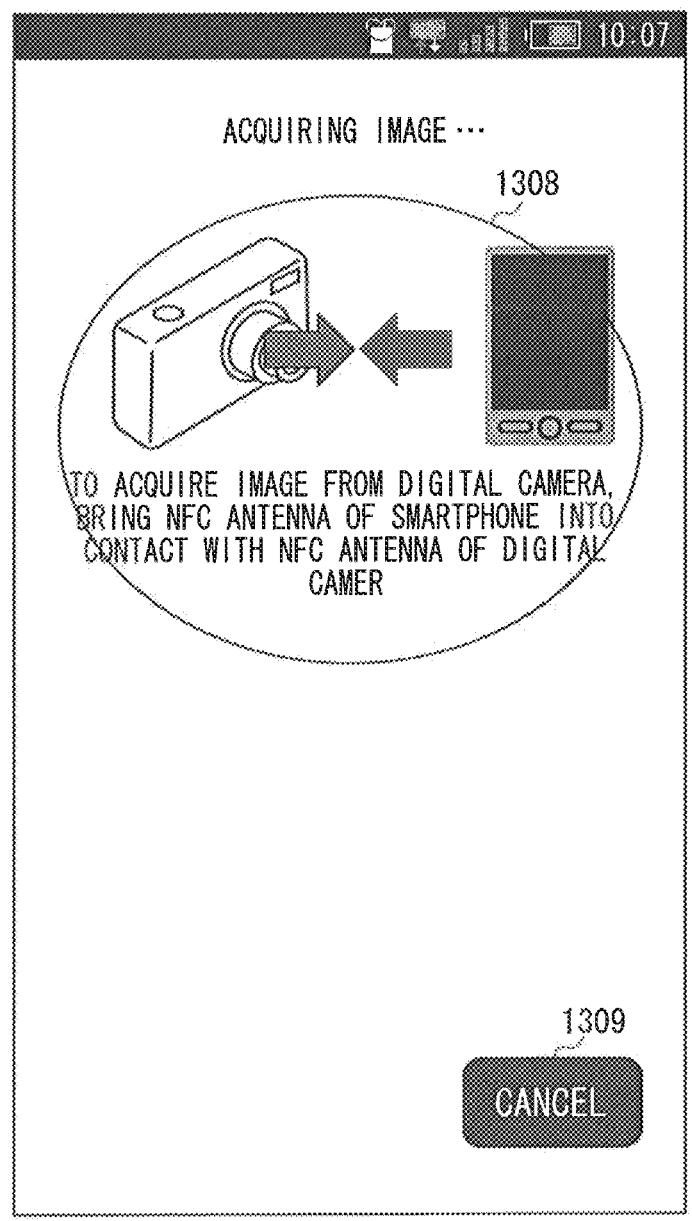

FIGS. 13A and 13B each illustrate a screen displayed on the display unit 154 of the mobile phone 150.

FIG. 13A illustrates a screen displayed on the display unit 154 by an application running on the mobile phone 150. The application running on the mobile phone 150 is an application for recording (checking in) a location visited by the user.

When the user touches a map icon 1301, a map (not illustrated) is displayed, and the user can select a location that the user desires to record (current position, place visited in the past).

An area 1302 is an area to display a name of a location to check in (location name). The name of the location selected using the map icon 1301 is displayed in the area 1302.

An area 1303 is an area of icons for inputting text. The user inputs characters one by one by touching or flicking an icon relating to a character that the user desires to input.

A comment area 1304 is an area to which the user inputs a string of characters that the user desires to record simultaneously with the check-in by use of the icons in the area 1303.

A camera icon 1305 is for attaching a still image to the check-in. When the user touches the camera icon 1305, the screen is switched to the screen illustrated in FIG. 13B for acquiring still image data for the check-in from an external digital camera.

A video icon 1306 is for attaching a moving image to the check-in. When the user touches the video icon 1306, the screen is changed to the state for acquiring moving image data for the check-in from an external video camera.

An icon 1307 for checking in at a selected location. When the user touches the icon 1307, a string of characters input in the comment area 1304, still image data selected using the camera icon 1305, and moving image data selected by using the video icon 1306 are saved as the check-in at the location selected using the icon 1301.

FIG. 13B illustrates a screen displayed on the display unit 154 to acquire still image data for the check-in.

A graphic 1308 is for prompting the user to bring the digital camera 100 and the mobile phone 150 close to each other so that the digital camera 100 and the mobile phone 150 can communicate with each other by near-field wireless communication.

An icon 1309 is for canceling the acquisition of still image data for the check-in. When the user touches the icon 1309, the screen returns to the screen display illustrated in FIG. 13A.

FIG. 14 schematically illustrates data to be acquired by the CPU 101 in step S1202.

Parameters 1401 to 1407 are various parameters for communication between the wireless LAN units 112 and 159, and operation statuses 1408 to 1412 are operation statuses of the application in the mobile phone 150.

An SSID 1401 is an SSID of an access point in a case where the wireless LAN unit 159 of the mobile phone 150 operates as the access point.

An authentication/encryption method 1402 is an authentication/encryption method used to connect to the wireless LAN unit 159. WPA2-PSK (TKIP), WEP, or the like is used.

A passphrase 1403 is a passphrase used in an encryption method specified by the authentication/encryption method 1402.

An IP address 1404 is an IP address to be assigned to the wireless LAN unit 112 of the digital camera 100.

A net mask value 1405 is a value of a net mask set to the wireless LAN unit 112 of the digital camera 100.

An IP address 1406 is a default gateway IP address set to the wireless LAN unit 112 of the digital camera 100.

An IP address 1407 is an IP address assigned to the wireless LAN unit 159 of the mobile phone 150. The digital camera 100 having received the data illustrated in FIG. 14 can communicate with the mobile phone 150 by use of the IP address 1407.

An application type 1408 is a type of an application running on the mobile phone 150. In a case of the check-in application illustrated in FIG. 13, the application type 1408 is "location".

Location information 1409 is information on a location focused by the application 1408 running on the mobile phone 150. In the example illustrated in FIG. 13A, the location information 1409 is the latitude and longitude of the location specified in the area 1302.

A data type 1410 is a type of data to be acquired by the application running on the mobile phone 150. In a case where the icon 1305 in FIG. 13A is touched, the data type 1410 is "still image". In a case where the icon 1306 is touched, the data type 1410 is "moving image".

Returning to FIG. 12A, in step S1203, the CPU 101 starts initialization for using the wireless LAN unit 112. In general, it takes several seconds for the wireless LAN function to be initialized and ready to be used. Thus, in the flow chart in FIG. 12A, the processing proceeds to the subsequent step, i.e., step S1204, without waiting for the completion of the initialization of the wireless LAN unit 112.

In step S1204, the CPU 101 determines conditions for sorting the image data stored in the storage medium 107 according to the data received in step S1202. For example, in a case where the data illustrated in FIG. 14 is received in step S1202, the CPU 101 determines sorting conditions as follows.

(a) Since the data type 1410 is "still image data", only still image data in the storage medium 107 is sorted.

(b) Since the application type 1408 is "location", the location of the capture of image data is determined to be an important factor in user selection. Then, among the pieces of image data, only the pieces of image data that have information on the captured place are sorted in order of increasing distance from a location designated by the location information 1409. Since what the user desires to record as the check-in is likely an event that relates to a place to check in, it can be expected that pieces of image data that relate to the check-in place will be gathered at the top thereof as a result of the sorting performed as described above.

In step S1205, the CPU 101 determines whether the image data that corresponds to the sorting conditions determined in step S1204 exists in the storage medium 107. If the image data to be sorted exists (YES in step S1205), the processing proceeds to step S1206. If no image data to be sorted exists (NO in step S1205), the processing proceeds to step S1207.

The operation performed in step S1205 will be described with reference to the examples illustrated in FIGS. 15A and 15B.

FIGS. 15A and 15B each illustrate image data stored in the storage medium 107.

In the example illustrated in FIG. 15A, ten pieces of image data are stored in the storage medium 107. In a case where data received in step S1202 is the data illustrated in FIG. 14, five pieces of data, i.e., data 1501, 1502, 1504, 1507, and 1509 are still image data and have information on the captured place. Thus, the data 1501, 1502, 1504, 1507, and 1509 are to be sorted.

On the other hand, in the example illustrated in FIG. 15B, five pieces of image data are stored in the storage medium 107. Three data 1511, 1512, and 1514 are still image data but do not have information on the captured place. Thus, no image data to be sorted exists.

In step S1206, the CPU 101 sorts the image data according to the sort conditions determined in step S1204.

The operation performed in step S1206 will be specifically described with reference to the examples illustrated in FIGS. 15A and 16A.

As described above, among the pieces of image data illustrated in FIG. 15A, the data 1501, 1502, 1504, 1506, 1507, 1508, and 1509 are to be sorted. The CPU 101 sorts the image data to be sorted in order of increasing distance from the location 1409 (latitude of 35.6400 degrees north, longitude of 139.8622 east). As a result, the CPU 101 sorts the data 1507, 1509, 1501, 1502, and 1504 in this order.

FIG. 16A illustrates the sorted result of the image data. As illustrated in FIG. 16A, the sorted result is the data 1507, 1509, 1501, 1502, and 1504 in this order.

Returning to FIG. 12A, in step S1207, the CPU 101 sorts the image data in reverse chronological order.

The operation performed in step S1207 will be described with reference to the examples illustrated in FIGS. 15B and 16B.

Among the pieces of image data illustrated in FIG. 15B, the still image data 1511, 1512, and 1514 are sorted in reverse chronological order. As a result, the data 1514, 1512, and 1511 are sorted in this order.

FIG. 16B illustrates the sorted result of image data. As illustrated in FIG. 16B, the sorted result is the data 1514, 1512, and 1511 in this order.

Returning to FIG. 12A, in step S1208, the CPU 101 generates Hypertext Mark-up Language (HTML) data according to the sorted result to display a list of image data. While the HTML data is generated as predetermined data in the present exemplary embodiment, Cascading Style Sheets (CSS) data or JavaScript (registered trademark) data may be generated as predetermined data.

FIG. 17A illustrates an example of HTML data generated in step S1208 according to the sorted result in FIG. 16A. According to the contents of the HTML data, thumbnail data of the image data is to be displayed in the order of the sorted result. A description 1701 is for displaying the image data 1507. Similarly, descriptions 1702, 1703, 1704, and 1705 are for displaying the image data 1509, 1501, 1502, and 1503, respectively.

Returning to FIG. 12A, in step S1209, the CPU 101 starts an operation of web server software to make the HTML data generated in step S1208 and the image data available to external apparatuses.

In step S1210, the CPU 101 waits for completion of the initialization of the wireless LAN unit 112 that is executed in step S1203. When the initialization of the wireless LAN unit 112 is completed and the change of settings of the wireless LAN unit 159 in step S1254, which will be described below, is completed (YES in step S1210), the digital camera 100 and the mobile phone 150 can communicate with each other via the wireless LAN. At this time, the connection configuration is as illustrated in FIG. 4C.

In step S1211, the CPU 101 waits for external connection to the web server software enabled in step S1209. When the CPU 101 detects the external connection (YES in step S1211), the processing proceeds to step S1212. Otherwise (NO in step S1211), the processing in step S1211 is repeated.

In step S1212, the CPU 101 determines whether a data acquisition request (HTTP GET command, etc.) for HTML data or image data is made to the web server software enabled in step S1209. If a data acquisition request is made (YES in step S1212), the processing proceeds to step S1213. On the other hand, if no data acquisition request is made (NO in step S1212), the processing proceeds to step S1214.

In step S1213, the CPU 101 sends back the HTML data generated in step S1208, the image data stored in the storage medium 107, or the like in response to the data acquisition request received in step S1212. When the sending back of data is completed, the processing returns to step S1212, and the CPU 101 checks a next data acquisition request.

On the other hand, in step S1214, the CPU 101 determines whether the wireless LAN units 112 and 159 can continue to communicate with each other. If the wireless LAN units 112 and 159 can no longer communicate with each other (YES in step S1214) i.e., a case where the access point function is disabled in step S1260, which will be described below, the flow chart is ended. On the other hand, if the wireless LAN units 112 and 159 can continue to communicate with each other (NO in step S1214), the processing returns to step S1212, and the CPU 101 checks a next data acquisition request.

Figure 12B:
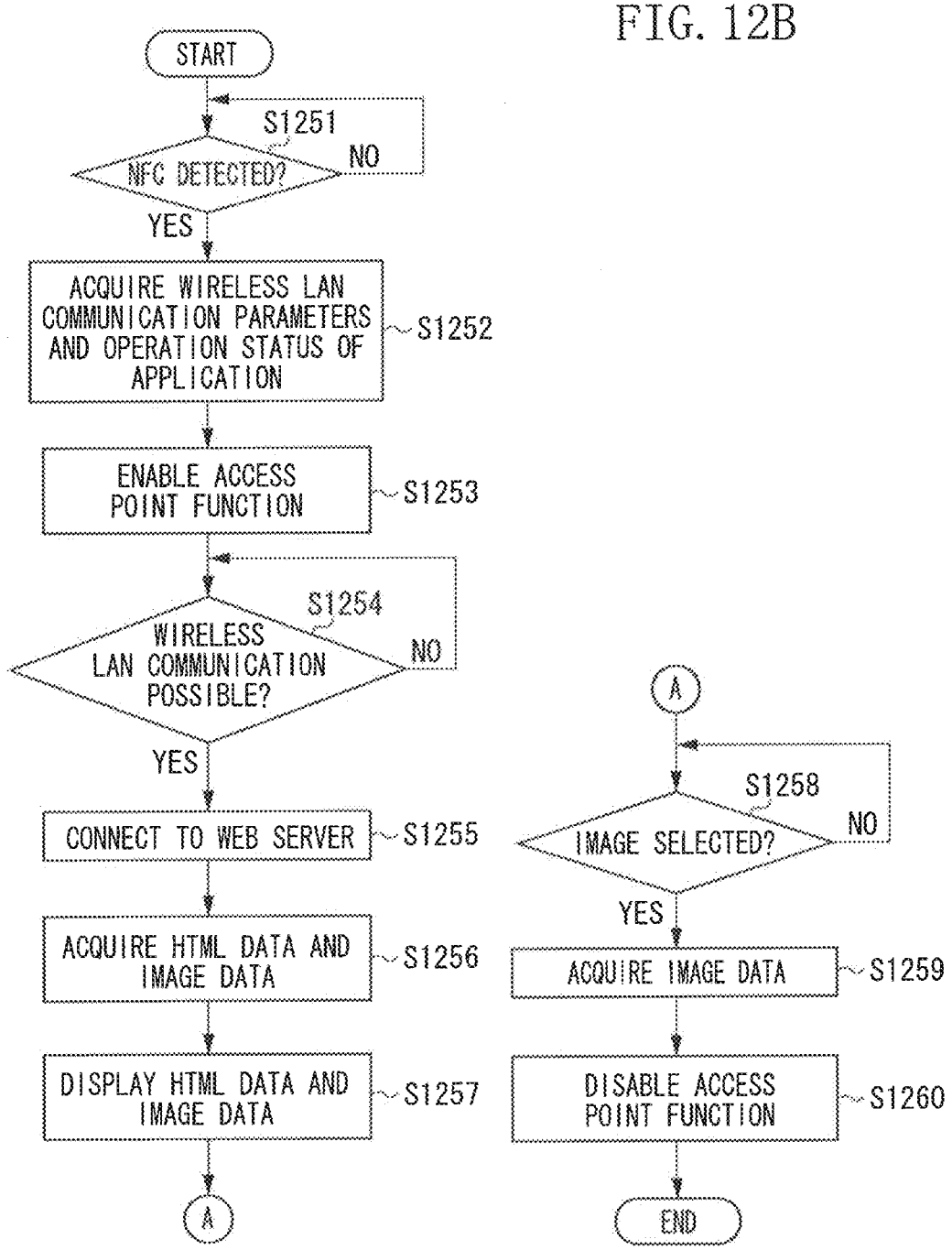

Next, details of the operations of the mobile phone 150 will be described with reference to the flow chart in FIG. 12B.

In step S1251, the CPU 151 monitors the state of the near-field wireless communication unit 158 to determine whether the near-field wireless communication unit 158 can communicate with the near-field wireless communication unit 111 of the digital camera 100. Specifically, the near-field wireless communication unit 158 can communicate with the near-field wireless communication unit 111 when the near-field wireless communication area 209 of the digital camera 100 and the near-field wireless communication area 305 of the mobile phone 150 are close enough to communicate. If the near-field wireless communication unit 158 can communicate with the near-field wireless communication unit 111 (YES in step S1251), the processing proceeds to step S552. The processing in step S1251 corresponds to the processing in step S1201.

In step S1252, the CPU 151 sends various parameters for communication between the wireless LAN units 112 and 159 and an operation status (FIG. 14) of an application in the mobile phone 150, by using the near-field wireless communication unit 158. The data sent in step S1252 is received by the digital camera 100 in step S1202.

In step S1253, the CPU 151 enables the access point function of the wireless LAN unit 159. At this time, the SSID 1401, the encryption method 1402, and the passphrase 1403 specified in FIG. 14 are used by the access point.

In step S1254, the CPU 151 waits until the wireless LAN units 159 and 112 become possible to communicate with each other. Specifically, when the processing in step S1210 is completed and the connection configuration of the digital camera 100 and the mobile phone 150 is changed to the state illustrated in FIG. 4C (YES in step S1254), the processing proceeds to step S1255.

In step S1255, the CPU 151 communicates with the digital camera 100 by use of the wireless LAN unit 159 and connects to the web server software activated in step S1209.

In step S1256, the CPU 151 acquires HTML data (FIG. 17A) from the digital camera 100 and the image data (thumbnail data) relating to the HTML data, by using the wireless LAN unit 159.

In step S1257, the CPU 151 displays (renders) on the display unit 154 the HTML data and the image data acquired in step S1256.

Figure 17B:
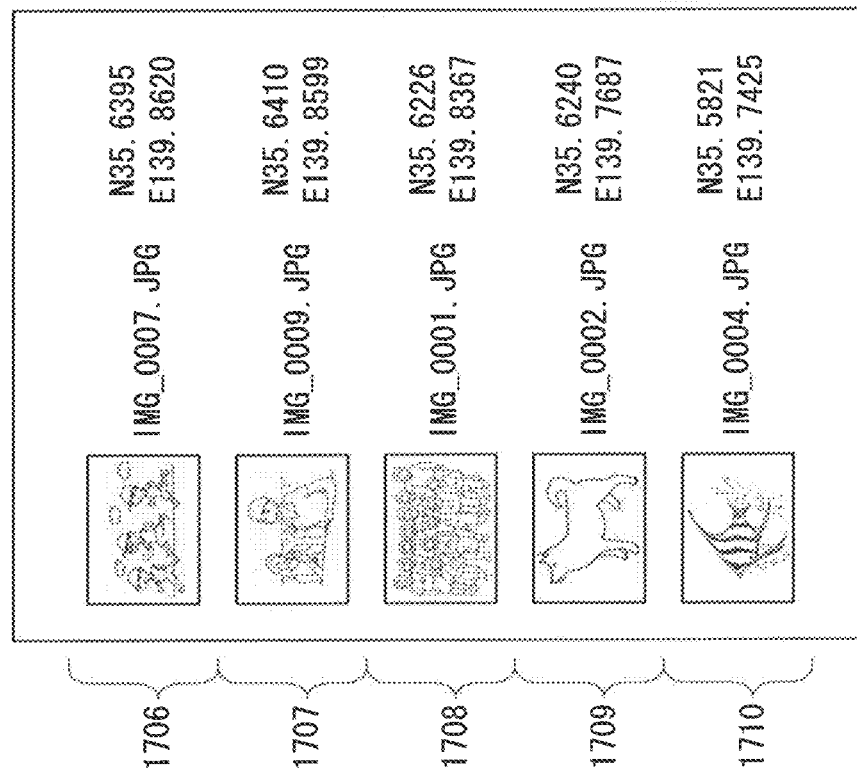

FIG. 17B illustrates a rendered result of the HTML data illustrated in FIG. 17A. The descriptions 1701, 1702, 1703, 1704, and 1705 of the HTML data are displayed as images 1706, 1707, 1708, 1709, and 1710, respectively.

Returning to FIG. 12B, in step S1258, the CPU 151 determines whether any of the images in FIG. 17B is touched using the operation unit 155. If any of the thumbnail data is selected (YES in step S1258), the processing proceeds to step S1259.

In step S1259, the CPU 151 captures the video image selected in step S1258 by use of the wireless LAN unit 159 from the digital camera 100. For example, in a case where the image 1706 in FIG. 17B is selected, based on the description 1701 of the corresponding HTML data, the CPU 151 requests for the acquisition of the image data IMG_0007.JPG to acquire the image data sent by the digital camera 100 in step S1213.

In step S1260, the CPU 151 disables the access point function enabled in step S1253, and the flow chart is ended. In this way, the communication between the digital camera 100 and the mobile phone 150 ends.

As described above, in the digital camera 100 storing a plurality of pieces of data, before the plurality of pieces of data is sent, they are sorted based on information acquired in advance, whereby the burden of data selection can be reduced.

As in the first exemplary embodiment, in a third exemplary embodiment, an example will be described in which a data processing apparatus according to the present exemplary embodiment is a digital camera having NFC and wireless LAN functions. In the present exemplary embodiment, data processed by the data processing apparatus is image data (still image or moving image), and an apparatus that can communicate with the data processing apparatus is a mobile phone (smartphone) having the NFC and wireless LAN functions.

<Description of Apparatuses>

A digital camera 100 and a mobile phone 150 according to the present exemplary embodiment are similar to those according to the second exemplary embodiment. Therefore, the description thereof is omitted.

A nonvolatile memory 103 of the digital camera 100 stores combinations (POI) of information on the names of locations such as sightseeing locations and landmarks and location information (latitude, longitude) as a database. Thus, the CPU 101 can acquire the latitude and longitude from the name of a location (geocoding) or can acquire the name of a location from the latitude and longitude (inverse geocoding).

<Description of Operations>

The operations of the digital camera 100 and the mobile phone 150 according to the present exemplary embodiment will be described with reference to the flow charts illustrated in FIGS. 18A and 18B and FIGS. 19 and 20. The description of those that are similar to those in the second exemplary embodiment is omitted as appropriate.

Figure 18A:
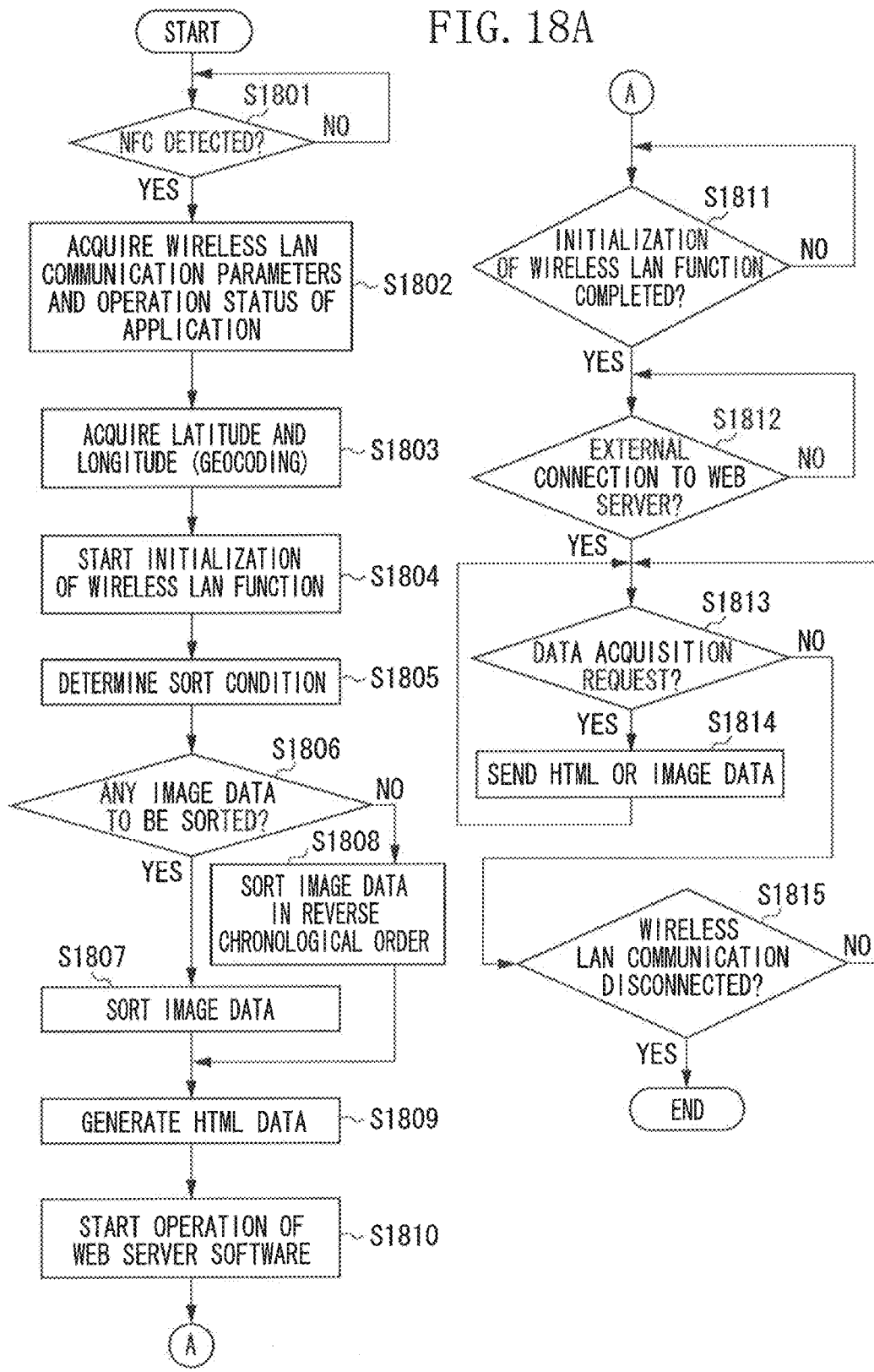
FIGS. 18A and 18B are flow charts respectively illustrating operations of a digital camera and operations of a mobile phone according to the third exemplary embodiment.

The operations of the digital camera 100 will be described in detail with reference to the flow chart illustrated in FIG. 18A. FIG. 18A is a flow chart illustrating communication processing of the digital camera 100. This flow chart is executed in the background in parallel with image capturing processing and GUI processing. The processing performed in steps S1801 and S1802 are similar to those performed in steps S1201 and S1202 in FIG. 12A, respectively. Therefore, the description thereof is omitted.

FIG. 19 schematically illustrates data acquired by the CPU 101 in step S1801.

Parameters 1901 to 1907 are for communication between the wireless LAN units 112 and 159, and operation statuses 1908 to 1912 are operation statuses of an application in the mobile phone 150.

The parameters 1901 to 1908 and 1910 are similar to the parameters 1401 to 1408 and 1410 in FIG. 14, respectively. Therefore, the description thereof is omitted.

The parameter 1909 is location name information on which the application 1908 running on the mobile phone 150 focuses. In the example illustrated in FIG. 13A, the parameter 1909 is a location name specified in the area 1302.

Returning to FIG. 18A, in step S1803, the CPU 101 converts the location name information 1909 acquired in step S1802 into the latitude and longitude by use of the POI database stored in the nonvolatile memory 103.

FIG. 20 is a table schematically illustrating a POI database stored in the nonvolatile memory 103. In the POI database, the location name (column 2001) and the latitude and longitude (column 2002) are stored in combination. The CPU 101 searches the column 2001 for a location name that matches the location name the longitude and the latitude of which the user desires to acquire, thereby acquiring the corresponding longitude and the latitude (values specified in the column 2002). For example, in a case of an XYZ aquarium, "N35.6400 E139.8622" 2003 is acquired as the latitude and longitude.

Returning to FIG. 18A, the processing performed in steps S1805 to S1815 are similar to those performed in steps S1204 to S1214 in FIG. 12, respectively. Therefore, the description thereof is omitted.

Figure 18B:
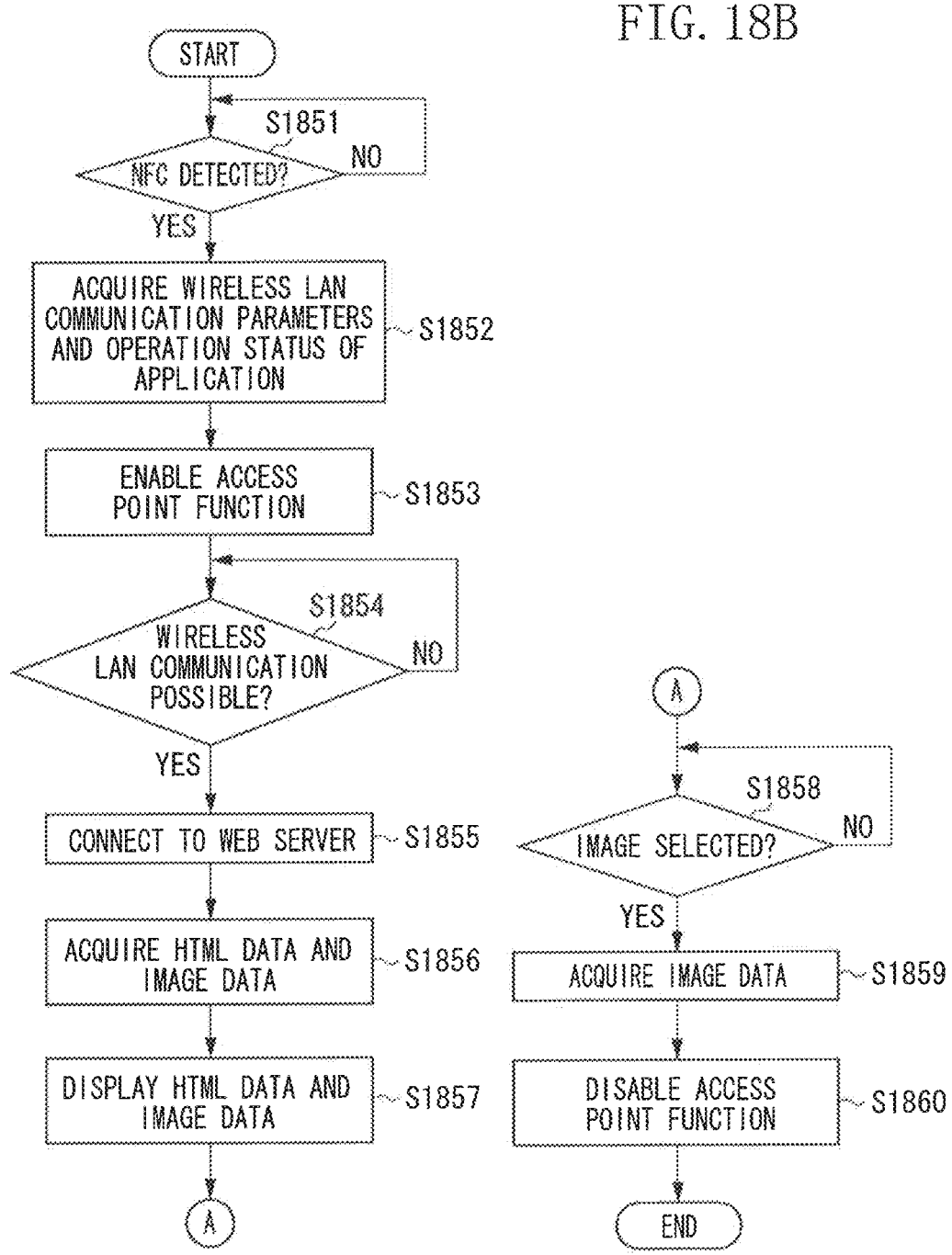

The operations of the mobile phone 150 will be described in detail with reference to the flow chart illustrated in FIG. 18B.

The processing performed in step S1851 is similar to that performed in step S1251, so that the description thereof is omitted. In step S1852, the CPU 151 sends various parameters for communication between the wireless LAN units 112 and 159 and the operation status of the application in the mobile phone 150 (FIG. 19) using the near-field wireless communication unit 158. The data sent in step S1851 is received by the digital camera 100 in step S1252.

The processing performed in Steps S1853 to S1860 are similar to those performed in steps S1253 to S1260, respectively, so description thereof is omitted.

As described above, in the digital camera 100 storing a plurality of pieces of data, before the plurality of pieces of data is sent, they are sorted based on information acquired in advance, whereby the burden of data selection can be reduced.

While image data (still image or moving image) is described as an example of data to be processed by the data processing apparatus in the first to third exemplary embodiments, the data to be processed is not limited to the image data, and may be any other data such as audio or text data.

Further, while the wireless LAN is used as the second communication unit, the communication method is not limited to the wireless LAN, and may be any other communication method such as Bluetooth (registered trademark).

Further, while the information on the application running on the mobile phone 150 is used as the sort information, the sort information is not limited thereto, and specific sort conditions such as "in order of increasing time from Jun. 15, 2012 12:00" or "in order of increasing distance from the Tokyo Metropolitan Government Office in Tokyo" may be used.

Further, while the digital camera is described as an example of the data processing apparatus in the exemplary embodiments, the data processing apparatus is not limited thereto, and may be any other apparatus such as a personal computer, a media player, a media server, a mobile phone, a personal digital assistant (PDA), a tablet computer, or a game apparatus.

Further, while the mobile phone is described as an apparatus that can communicate with the data processing apparatus according to the exemplary embodiments of the present invention, the apparatus is not limited thereto, and may be any other apparatus such as a personal computer, a media player, a media server, a mobile phone, a PDA, a tablet computer, or a game apparatus.

Other Exemplary Embodiment

The apparatus using the touch panel is described in the above-described exemplary embodiments as an example of an apparatus for inputting an instruction to select image data to be sent. The apparatus may be configured in such a manner that, for example, a selected state and a non-selected state may be discriminated, and an image in the selected state may be changed by use of, for example, direction keys. For example, a frame surrounding an image is displayed and moved using direction keys. In this case, when a list of images is displayed, the images are listed in order of priority given on the position at which the frame is displayed first. In this way, the amount of operations that the user needs to perform to select a desired image can be reduced.

The exemplary embodiments of the present invention can be realized by supplying a program for realizing one or more functions of the above-described exemplary embodiments to a system or apparatus via a network or storage medium so that one or more processors of a computer in the system or apparatus read and execute the program. Further, the exemplary embodiments of the present invention can also be realized by a circuit realizing one or more functions (e.g., application specific integrated circuit (ASIC)).

According to the exemplary embodiments of the present invention, for example, the burden on the user can be reduced in selecting data to be sent to another apparatus from a data processing apparatus storing a plurality of pieces of data.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-018672 filed Feb. 3, 2014, which is hereby incorporated by reference herein in its entirety.

What is claimed is:

1. A portable data processing device comprising:
a first antenna;
a first communication unit configured to connect to an external device using the first antenna via a first communication;
a second antenna;
a second communication unit configured to connect to the external device using the second antenna via a second communication different from the first communication, wherein a communication range of the second communication using the second antenna is longer than a communication range of the first communication using the first antenna; and
a control unit configured to perform control so that a plurality of contents is recorded in a recording medium,
wherein the control unit receives via the first communication a communication parameter for connecting via the second communication to the external device together with a type of an application running on the external device, wherein the application running on the external device uses the plurality of contents,
wherein, in a case where the control unit receives via the first communication the communication parameter and the type of the application the control unit performs control so that the plurality of contents is sorted based on the type of the application that is received from the external device via the first communication unit, and controls the second communication unit to connect to the external device via the second communication using the communication parameter that is received from the external device via the first communication,
wherein the control unit controls the second communication unit to send the plurality of contents which are sorted to the external device after connecting to the external device via the second communication.

2. The portable data processing device according to claim 1, wherein the control unit starts sorting the plurality of contents based on the type of the application after the type of the application is received via the first communication unit and before communication with the external device is established by the second communication unit.

3. The portable data processing device according to claim 1, wherein in parallel with execution of processing to establish the connection via the second communication based on the communication parameter received via the first communication unit, the control unit sorts the plurality of contents based on the type of the application.

4. The portable data processing device according to claim 1, wherein the second communication unit sends information about a result of the sorting to the external device.

5. The portable data processing device according to claim 1, wherein in a case where the type of the application is not acquired by the first communication unit, the control unit sorts the plurality of contents based on time/date information associated with each of the plurality of contents.

6. The portable data processing device according to claim 1, wherein the type of the application contains at least one of information for identifying a file type.

7. The portable data processing device according to claim 1, wherein data stored in a data storage unit is output by use of the second communication unit in an order according to a result of the sorting.

8. A method for controlling a portable data processing device, comprising:
performing control so that a plurality of contents is recorded in a recording medium;
connecting to an external device using a first antenna via a first communication and receiving via the first communication a communication parameter for connecting to via a second communication different from the first communication the external device and a type of an application running on the external device, wherein the application running on the external device uses the plurality of contents,
in a case where the control unit receives via the first communication the communication parameter and the type of the application, performing control so that the plurality of contents is sorted based on the type of the application that is received from the external device via the first communication and connecting to the external device via the second communication using a second antenna using the communication parameter that is received via the first communication;

sending the plurality of contents which are sorted to the external device after connecting to the external device via the second communication, wherein a communication range of the second communication using the second antenna is longer than a communication range of the first communication using the first antenna.

9. A non-transitory computer-readable storage medium storing a program for causing a computer to execute the method for controlling the data processing device according to claim 8.

* * * * *